(12) United States Patent
Michael

(10) Patent No.: US 12,497,193 B2
(45) Date of Patent: Dec. 16, 2025

(54) CANARD MOVEMENT DYNAMIC RANGE VERIFICATION VIA NON-CONTACT OPTICAL MEASUREMENT

(71) Applicant: BAE Systems Information and Electronic Systems Integration Inc., Nashua, NH (US)

(72) Inventor: Feras Michael, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 304 days.

(21) Appl. No.: 18/057,460

(22) Filed: Nov. 21, 2022

(65) Prior Publication Data
US 2024/0166375 A1    May 23, 2024

(51) Int. Cl.
*B64F 5/60*          (2017.01)

(52) U.S. Cl.
CPC ...................................... *B64F 5/60* (2017.01)

(58) Field of Classification Search
CPC ......................................................... B64F 5/60
See application file for complete search history.

(56) References Cited

U.S. PATENT DOCUMENTS

| | | | |
|---|---|---|---|
| 5,793,492 A * | 8/1998 | Vanaki | G01B 11/105 356/613 |
| 6,716,220 B2 * | 4/2004 | Saracione | A61B 90/14 119/752 |
| 6,907,799 B2 * | 6/2005 | Jacobsen | B64F 5/30 901/44 |
| 9,347,750 B2 * | 5/2016 | Larsson | F42B 10/60 |
| 10,520,291 B1 | 12/2019 | Vasudevan et al. | |
| 11,740,055 B1 | 8/2023 | Choiniere et al. | |
| 2011/0297783 A1 | 12/2011 | Martinez | |
| 2015/0134274 A1 * | 5/2015 | Froom | B64F 5/40 702/35 |
| 2020/0400412 A1 | 12/2020 | Zemany et al. | |
| 2021/0055079 A1 * | 2/2021 | Choiniere | F41G 7/2253 |
| 2022/0363386 A1 | 11/2022 | Treadway et al. | |
| 2025/0145309 A1 * | 5/2025 | Brown, Jr. | G06T 7/0004 |

FOREIGN PATENT DOCUMENTS

CN          208255378 U    *   12/2018

OTHER PUBLICATIONS

International Search Report, PCT/US23/80200, mailed Mar. 25, 2024, 9 pages.

* cited by examiner

*Primary Examiner* — John Fitzgerald
(74) *Attorney, Agent, or Firm* — Sand, Sebolt & Wernow LPA

(57) ABSTRACT

A laser canard test system (LCTS) that includes a test bench assembly, at least one laser controller operably engaged with the test bench assembly, at least one laser sensor device operably engaged with the test bench assembly and in electrical communication with the at least one laser controller, and a canard testing protocol in logical communication with the at least one laser controller and the at least one laser sensor device to enable the at least one laser controller to command the at least one laser device to measure at least one canard on a payload free from contacting the at least one canard of the payload.

20 Claims, 16 Drawing Sheets

CANARD MOVEMENT DYNAMIC RANGE VERIFICATION VIA NON-CONTACT OPTICAL MEASUREMENT

TECHNICAL FIELD

The present disclosure generally relates to a testing system for canard movement of a payload.

BACKGROUND

In military operations, various types of munitions provided on launch vehicles include canards or fins that are configured to steer and guide the munitions to specific targets. Generally, these canards provided on munitions are controlled by on-board electronic systems to rotate and move in order to steer and guide these launch vehicles. For example, a first set of canards provided on a munition may be rotated for steering and guiding the roll of the launch vehicle as the launch vehicle travels from a launched position to a targeted position. In this same example, a second set of canards provided on the munition may be rotated for steering and guiding the pitch of the launch vehicle as the launch vehicle travels from the launched position to the targeted position. As such, the accuracy and precision of rotating these canards to specific angular locations determines the accuracy and precision of steering and guiding launch vehicles to specific targets.

To maintain the accuracy and precision of rotating these canards, these canards must be routinely tested and analyzed to verify that these canards are rotating to the specific angular locations commanded by on-board electronic systems of the launch vehicles. Generally, however, methods and devices of testing and analyzing the rotation of these canards require extreme care and minimal risk of damaging or marring the surfaces of these canards. Any damage or marring to the surfaces of these canards may result in aerodynamic issues when guiding and steering launch vehicles through the air. As such, conventional methods and devices used in the military field to test and analyze these canards may require extensive time and labor in order to prevent any damage or marring to the surfaces of these canards.

SUMMARY

The presently disclosed laser canard test system (LCTS) is configured to test and analyze rotary displacement of at least one canard of a payload without contacting the at least one canard. More particularly, the presently disclosed LCTS includes a testing protocol that is stored and executed by at least one laser controller and at least one laser sensor device of LCTS to test and analyze rotary displacement of at least one canard of a payload without contacting the at least one canard. The testing protocol may include a step framework that enables LCTS to statically measure rotary displacement of the at least one canard of the payload. The testing protocol may include a sweep framework that enables LCTS to dynamically measure rotary displacement of the at least one canard of the payload. The presently disclosed LCTS addresses some of the inadequacies of previously known systems and methods of measuring at least one canard of a payload.

In one aspect, an exemplary embodiment of the present disclosure may provide a laser canard test system (LCTS). LCTS may include a test bench assembly, at least one laser controller operably engaged with the test bench assembly, at least one laser sensor device operably engaged with the test bench assembly and in electrical communication with the at least one laser controller; and a computer readable medium having a canard testing protocol which, when performed by the at least one laser controller, causes the at least one laser device to measure at least one canard on a payload free from contacting the at least one canard of the payload.

This exemplary embodiment or another exemplary embodiment may further include that the canard testing protocol comprises: at least one set of testing instructions which, when performed by the at least one laser controller, commands the at least one laser sensor device to one of: statically measure the at least one canard when the at least one canard is stationary; or dynamically measure the at least one canard when the at least one canard is moving. This exemplary embodiment or another exemplary embodiment may further include that the canard testing protocol comprises: a set of step testing instructions which, when performed by the at least one laser controller, commands the at least one laser sensor device to statically measure the at least one canard when the at least one canard is stationary. This exemplary embodiment or another exemplary embodiment may further include that the set of step testing instructions comprises: a first set of step commands which, when performed by the at least one laser controller, commands the at least one laser sensor device to statically measure the at least one canard at a first angle when the at least one canard is stationary at a first angular position. This exemplary embodiment or another exemplary embodiment may further include that the set of step testing instructions further comprises: a second set of step commands which, when performed by the at least one laser controller, commands the at least one laser sensor device to statically measure the at least one canard at a second angle when the at least one canard is stationary at a second angular position subsequent to the at least one canard moving from the first angular position to the second angular position. This exemplary embodiment or another exemplary embodiment may further include that the step testing framework further comprises: a third set of step commands which, when performed by the at least one laser controller, commands the at least one laser sensor device to statically measure the at least one canard at a third angle when the at least one canard is stationary at a third angular position subsequent to the at least one canard moving from the second angular position to the third angular position. This exemplary embodiment or another exemplary embodiment may further include that the canard testing protocol comprises: a set of sweep testing instructions which, when performed by the at least one laser controller, commands the at least one laser sensor device to dynamically measure the at least one canard when the at least one canard is moving. This exemplary embodiment or another exemplary embodiment may further include that the set of sweep testing instructions comprises: a first set of sweep commands which, when performed by the at least one laser controller, commands the at least one laser sensor device to dynamically measure the at least one canard at a first set of angles when the at least one canard is moving from a home angular position to a first angular position. This exemplary embodiment or another exemplary embodiment may further include that the set of sweep testing instructions further comprises: a second set of sweep commands which, when performed by the at least one laser controller, commands the at least one laser sensor device to dynamically measure the at least one canard at a second set of angles when the at least one canard is moving from the first angular position to a second angular position. This exemplary embodiment or another exemplary embodiment may further include that the set of sweep testing instructions further comprises: a third set of sweep commands which, when performed by the at least one laser controller, commands the at least one laser sensor device to dynamically measure the at least one canard at a third set of angles when the at least one canard is moving from the second angular position to the home angular position.

In another aspect, an exemplary embodiment of the present disclosure may provide a method. The method may comprise steps of: engaging a payload to a test bench assembly of a laser canard test system (LCTS); commanding the payload to move at least one canard from a home position to at least one angular position; executing a canard testing protocol, via at least one laser controller of the LCTS, provided on a computer readable medium of the LCTS; measuring the at least one canard, via at least one laser sensor device of the LCTS, at the at least one angular position defining a first angle without contacting the at least one canard; and verifying the at least one angular position executed by the payload, via the at least one laser controller of the LCTS, is within a predetermined angle range relative to the first angle measured by the at least one laser sensor device.

This exemplary embodiment or another exemplary embodiment may further include a step of choosing a set of step testing instructions of the canard testing protocol or a set of sweep testing instructions of the canard testing protocol; wherein when the set of step testing instructions is chosen, the at least one angular position is measured statically when the at least one canard is stationary; and wherein when the set of sweep testing instructions is chosen, the at least one angular position is measured dynamically as the at least one canard is moving. This exemplary embodiment or another exemplary embodiment may further include steps of: commanding the payload to move the at least one canard from the at least one angular position to at least another angular position opposite to the at least one angular position; and measuring the at least one canard, via the at least one laser sensor device of the LCTS, at a second angle without contacting the at least one canard when the at least one canard is stationary at the at least another angular position. This exemplary embodiment or another exemplary embodiment may further include step of: commanding the payload to move the at least one canard from the at least another angular position to the home position; and measuring the at least one canard, via the at least one laser sensor device of the LCTS, at a third angle without contacting the at least one canard when the at least one canard is stationary at the home position. This exemplary embodiment or another exemplary embodiment may further include a step of verifying the at least another angular position and the home position executed by the payload, via the at least one laser controller of the LCTS, is within the predetermined angle range relative to the second angle and the third angle measured by the at least one laser sensor device. This exemplary embodiment or another exemplary embodiment may further include that the step of measuring the at least one canard, via the at least one laser sensor device of the laser canard test system, at the at least one angular position defining the first angle without contacting the at least one canard further includes that the first angle is defined within a first range of angles, via the set of sweep testing instructions, as the at least one canard moves from the home position to the at least one angular position. This exemplary embodiment or another exemplary embodiment may further include steps of: commanding the payload to move the at least one canard from the at least one angular position to at least another angular position opposite to the at least one angular position; and measuring a second range of angles, via the at least one laser sensor device of the LCTS, as the at least one canard moves from the at least one angular position to the at least one angular position without contacting the at least one canard. This exemplary embodiment or another exemplary embodiment may further include steps of commanding the payload to move the at least one canard from the at least another angular position to the home position; and measuring the at least one canard, via at least one laser sensor device of the LCTS, at a third set of angles without contacting the at least one canard as the at least one canard moves from the at least another angular position to the home position. This exemplary embodiment or another exemplary embodiment may further include a step of verifying the at least another angular position and the home position executed by the payload, via the at least one laser controller of the LCTS, is within the predetermined angle range relative to the second set of angles and the third set of angles measured by the at least one laser sensor device. This exemplary embodiment or another exemplary embodiment may further include steps of: engaging a zero-reference payload to the test bench assembly; and calibrating the at least one laser controller and the at least one laser sensor device of the laser canard test system, via the canard testing protocol of the laser canard test system, to at least one zero-reference canard of the zero-reference payload prior to introducing the payload.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

FIGS. 1-9C illustrate a laser canard test system (hereinafter "LCTS") generally referred to as 10. As described in more detail below, LCTS 10 is configured to measure rotational displacement of at least one canard of a payload or unit under test (UUT) operably engaged with LCTS 10 and is in electrical communication with LCTS 10 free from contacting the at least one canard. As also described in more detail below, LCTS 10 is provided with a testing protocol having at least one testing framework for measuring rotational displacement of at least one canard of a payload without contacting the at least one canard. Such assemblies and components of LCTS 10 are now described in more detail below.

LCTS 10 may include a test bench assembly 20. The test bench assembly 20 may include a base table 22 and at least one stand 24 that operably engages with the base table 22. In the illustrated embodiment, the at least one stand 24 includes an upright support 26 that operably engages with the base table 22 and a shelf 28 that operably engages with the upright support 26 at a desired height vertically above the base table 22. As described in more detail below, the shelf 28 is configured to operably engage with at least one laser sensor device of LCTS 10 and is configured to set the at least one laser sensor device at the desired height, via the upright support 26, to align the at least one laser sensor device with at least one canard of a payload operably engaged with the test bench assembly 20. Although LCTS 10 is shown as testing the UUT in a vertical position, it is entirely possible for the UUT to be in a horizontal configuration during the test.

Figure 1:
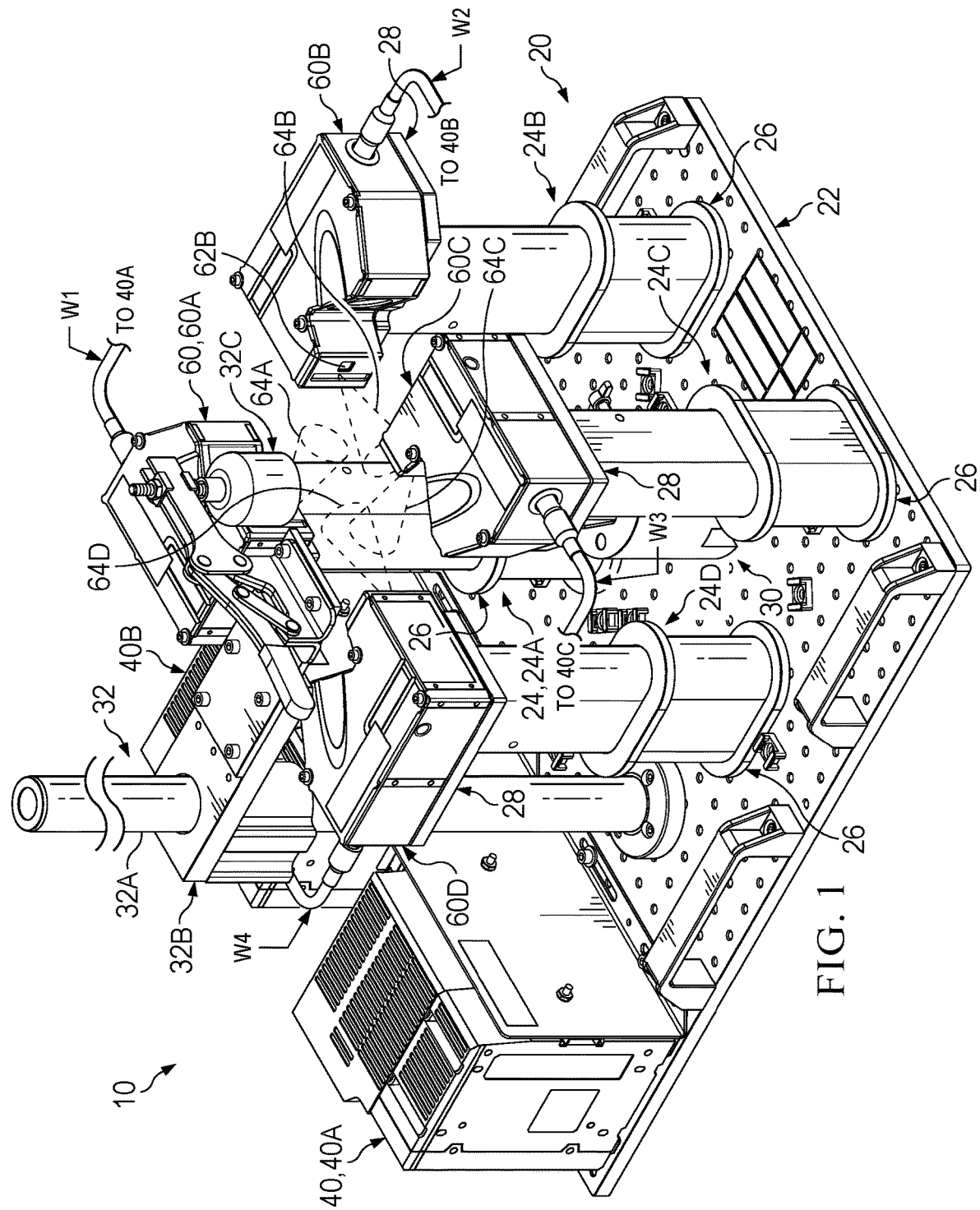
FIG. 1 (FIG. 1) is a top, front, first side isometric perspective view of a laser canard test system (LCTS) in accordance with the present disclosure, wherein LCTS includes a test bench assembly, at least one laser controller, and at least one laser sensor device.

It should be understood that any suitable number of stands 24 may be operably engaged with the base table 22 based on various considerations, including the number of laser sensor devices of a LCTS used to measure rotational displacement of canards of a payload. As illustrated in FIG. 1, LCTS 10 includes four stands 24A, 24B, 24C, 24D that operably engage with the base table 22 to enable four laser sensor device of LCTS 10 to measure rotational displacement of four canards structurally configured to a payload.

It should also be understood that the at least one stand 24 may have any suitable structural configuration to directly align a laser sensor device with at least one canard of a payload. In one example, a shelf of at least one stand may be vertically adjustable relative to a base table, via an upright support of the at least one stand, to vertically move the shelf vertically downward or vertically upward to directly align a laser sensor device with at least one canard of a payload. In another example, a shelf of at least one stand may be fixedly set at a vertical height relative to a base table due to an upright support of the at least one stand being set a permanent height.

Figure 3:
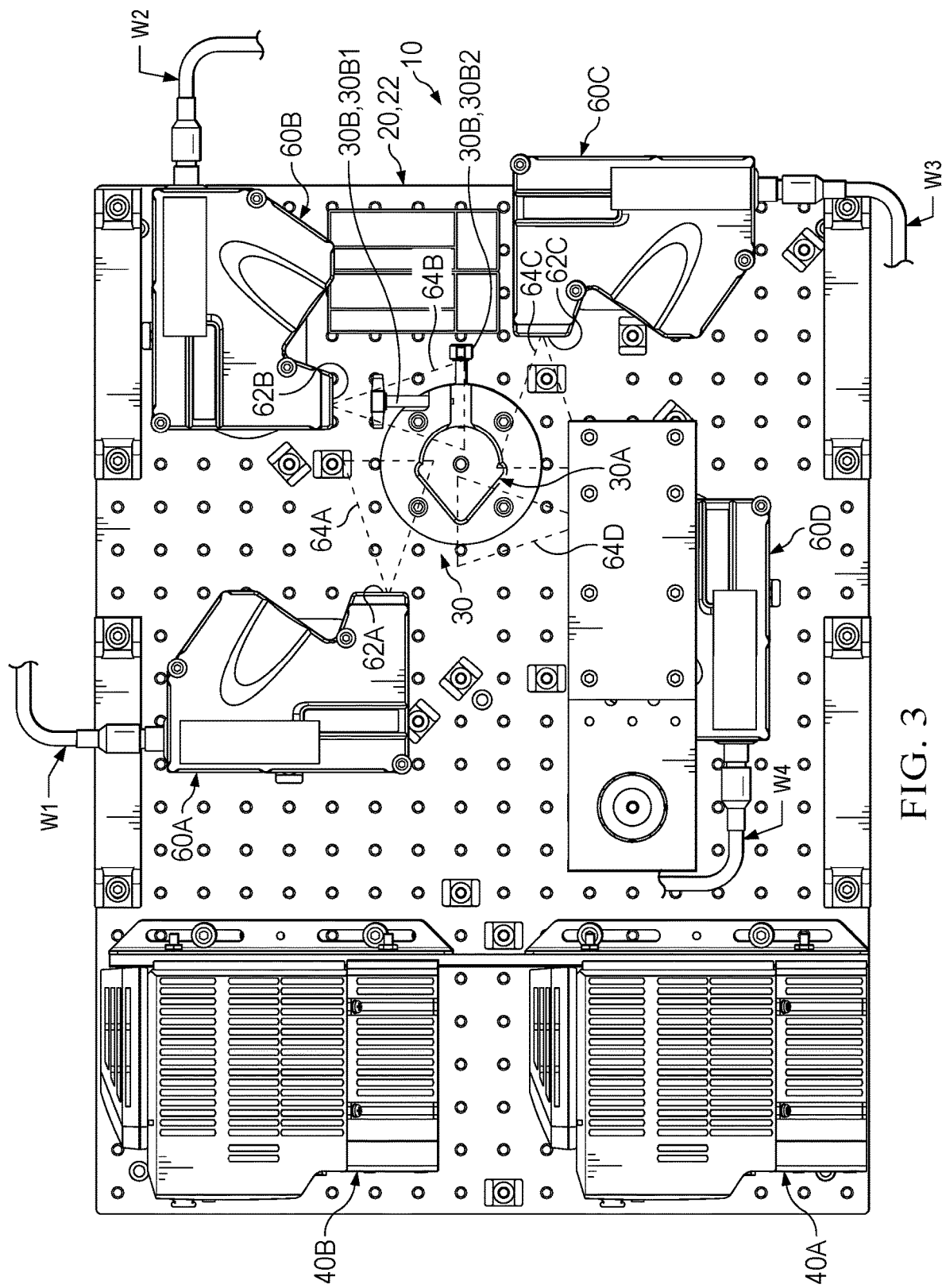
FIG. 3 (FIG. 3) is a top plan view of LCTS shown in FIG. 1, but a portion of a payload retaining assembly of the test bench assembly is removed.

Test bench assembly 20 may also include payload orientation tool 30. As best seen in FIG. 3, the payload orientation tool 30 is configured to operably engage with the base table 22 between the stands 24 on the base table 22. As best seen in FIG. 3, the payload orientation tool 30 defines a V-shaped groove 30A that is configured to receive a portion of a payload to maintain the payload vertically upright on the base table 22 during testing operations. As best seen in FIG. 3, the payload orientation tool 30 also includes at least one adjustable thumbscrew 30B that releasably secures a payload with the payload orientation tool 30 inside of the V-shaped groove 30A during testing operations. In the illustrated embodiment, the payload orientation tool 30 includes a first adjustable thumbscrew 30B1 that releasably secures a payload with the payload orientation tool 30 inside of the V-shaped groove 30A at a first location on the payload. The payload orientation tool 30 also includes a second adjustable thumbscrew 30B2 that releasably secures the payload with the payload orientation tool 30 inside of the V-shaped groove 30A at a second location on the payload that is orthogonal to the first location on the payload.

Figure 2:
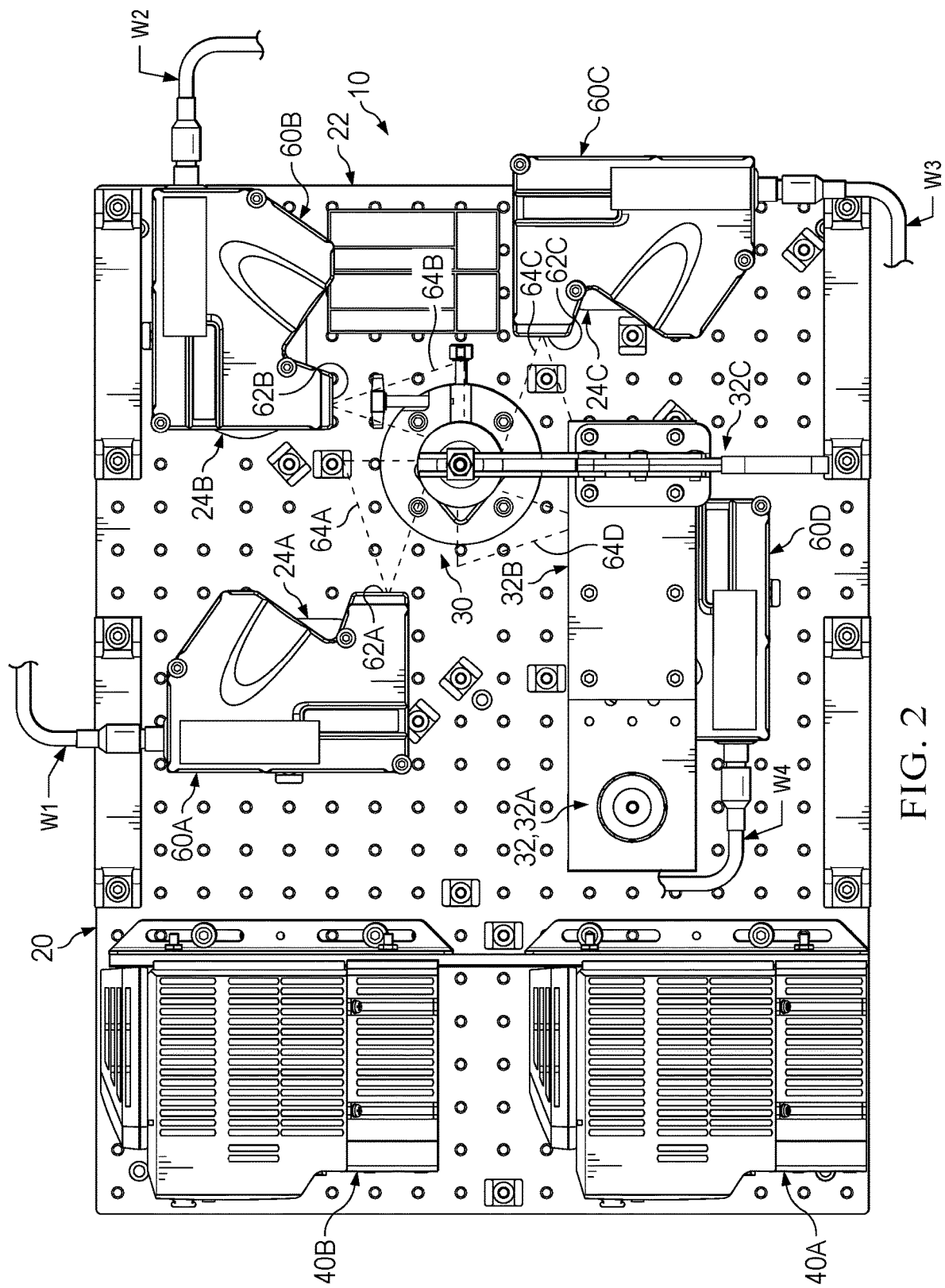
FIG. 2 (FIG. 2) is a top plan view of LCTS shown in FIG. 1.
Figure 4A:
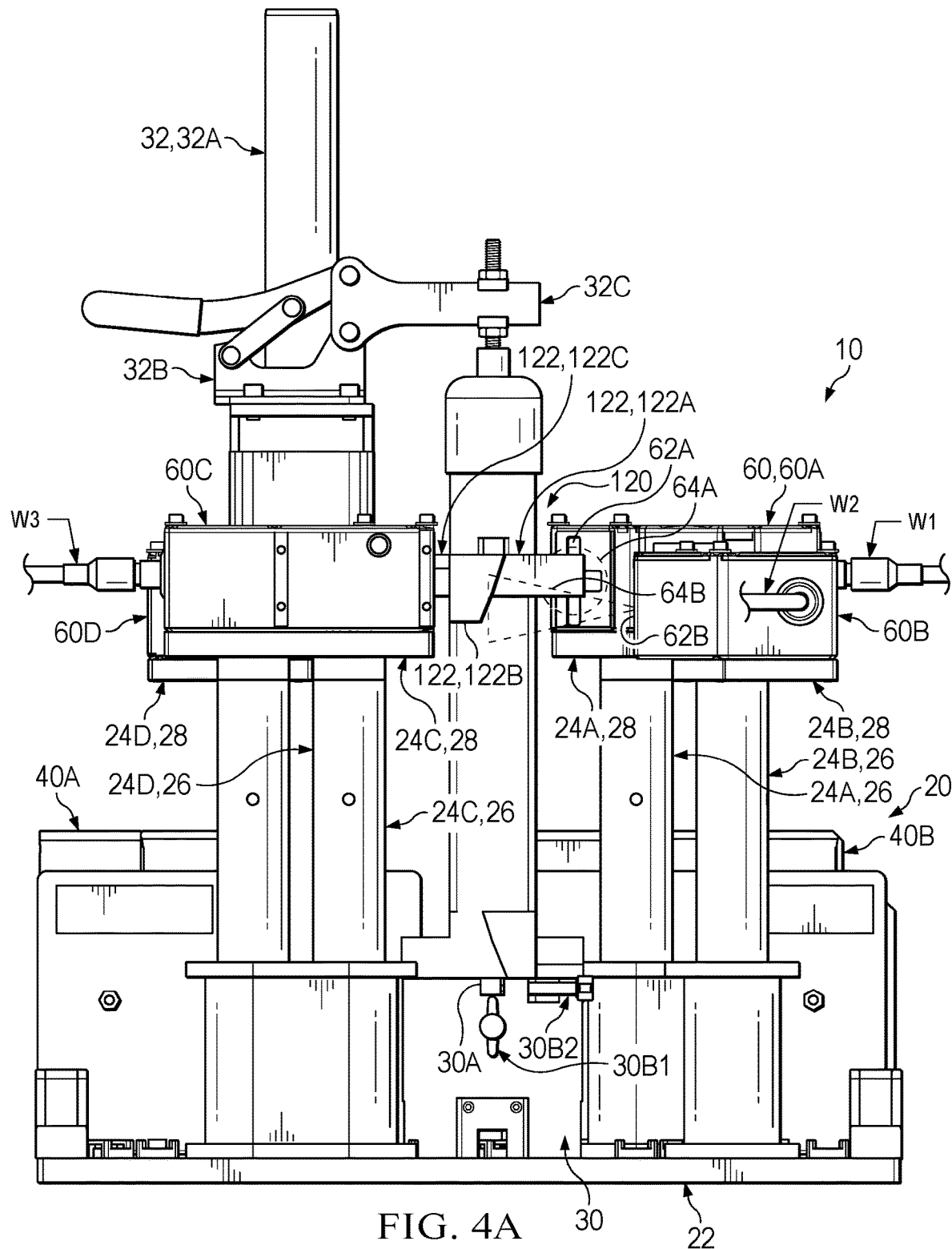
FIG. 4A (FIG. 4A) is an operational view of LCTS, wherein the at least one laser sensor device is measuring at least one zero-reference canard of a zero-reference device.
Figure 4B:
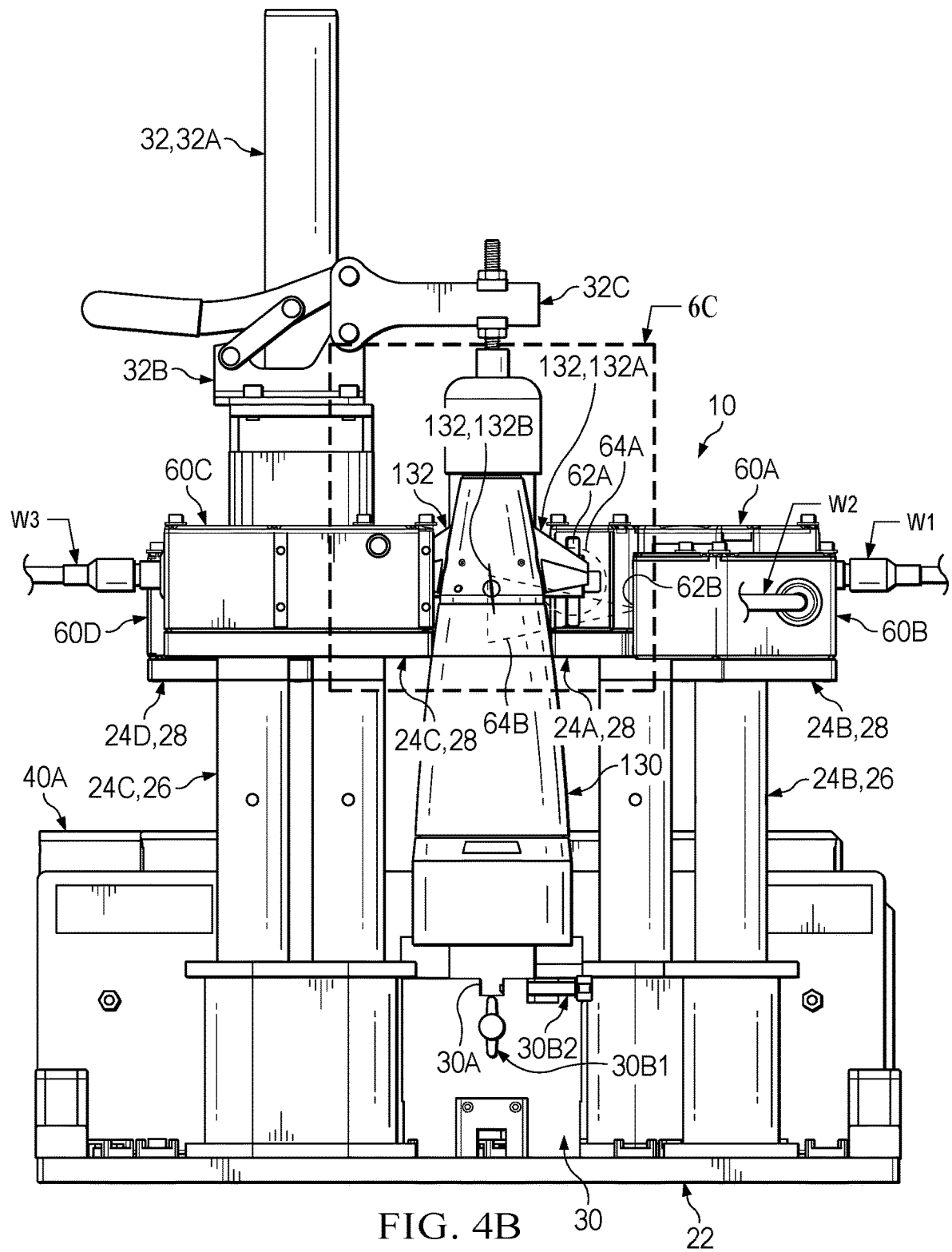
FIG. 4B (FIG. 4B) is an operational view of LCTS similar to FIG. 4A, but the zero-referenced device is removed and the at least one laser sensor device is measuring at least one canard of a unit under test.

Test bench assembly 20 may also include a payload retaining assembly 32. As best seen in FIGS. 1 and 2, the payload retaining assembly 32 includes a column 32A that operably engages with the base table 22, an adjustable plate 32B releasably engaged with the column 32A and moveable along the column 32A, and a payload engagement mechanism 32C operably engaged with the adjustable plate 32B. Upon assembly, the payload engagement mechanism 32C is positioned vertically above the payload orientation tool 30 such that the payload engagement mechanism 32C is vertically aligned with the V-shaped groove 30A of the payload orientation tool 30. During operation, the adjustable plate 32B and the payload engagement mechanism 32C are collectively vertically moveable along the column 32A to enable various types of payloads and UUTs to be secured between the payload orientation tool 30 and the payload engagement mechanism 32C of the payload retaining assembly 32. As best seen in FIGS. 4A and 4B, a first or top end of a payload is operably engaged with the payload engagement mechanism 32C while a second or bottom end of the payload opposite to the top end of the payload is operably engaged with the payload orientation tool 30.

LCTS 10 may also include at least one laser controller 40 that operably engages with the test bench assembly 20. As best seen in FIGS. 1 and 2, LCTS 10 includes at least one laser controller 40 that operably engages with the base table 22 of the test bench assembly 20. As described in more detail below, the at least one laser controller 40 is also electrically connected with at least one laser sensor device of LCTS 10 such that the at least one laser controller 40 and the at least one laser sensor device are in electrical communication with one another. As also described in more detail below, the at least one laser controller 40 is also configured store and execute a testing protocol or computer-readable media of LCTS 10 for measuring rotational displacement of at least one canard of a unit under test.

It should be understood any suitable number of controllers may be used for a LTCS based on various considerations, including the number of laser sensor devices being used to measure rotational displacement of canards of a payload. In the illustrated embodiment, a first controller 40A may be provided with LCTS 10 for controlling and communicating with at least one laser sensor device of LCTS 10, and a second controller 40B may be provided with LCTS 10 for controller and communication with at least another two laser sensor device of LCTS 10. In other exemplary embodiments, any suitable number of controllers may be provided with a LCTS for controlling and communicating with any suitable number of laser sensor devices configured for measuring rotational displacement of canards of different payloads.

It should also be understood that the at least one laser controller 40 of LCTS 10 may be any commercially-available controller for controlling and commanding any suitable number of laser sensor devices of LCTS 10 for measuring rotational displacement of canards of a payload. In one example, LCTS 10 may include Keyence base controllers LJ-X8000 for controlling and commanding any suitable number of laser sensor devices of LCTS 10 for measuring rotational displacement of canards of a payload.

LCTS 10 may also include at least one laser sensor device 60 that operably engages with the test bench assembly 20 and electrically connects with the at least one laser controller 40. As best seen in FIGS. 1 and 2, the at least one laser sensor device 60 operably engages with the shelf 28 of the at least one stand 24 to align the at least one laser sensor device 60 with at least one canard of a payload. The at least one laser sensor 60 is also electrically connected with the at least one laser controller 40 via at least one electrical connection W. The at least one laser sensor device 60 also includes at least one embedded sensor 62 that is configured to emit a light source or laser profiler light beam 64 for measuring rotational displacement of at least one canard of a payload. As described in more detail below, the at least one laser sensor device 60 is configured to output the measured rotational displacement of the at least one canard of the payload to the at least one laser controller 40 via a testing protocol of LCTS 10 stored and executed on the at least one laser controller 40.

It should be understood that any suitable number of laser sensor devices may be included in a LCTS based on various considerations, including the number of canards provided on a payload that are to be tested by a LCTS. In the illustrated embodiment, a first laser sensor device 60A may be operably engaged with the shelf 28 of the first stand 24A and electrically connected with the first controller 40A via a first electrical connection W1, a second laser sensor device 60B may be operably engaged with the shelf 28 of the second stand 24B and electrically connected with the second controller 40B via a second electrical connection W2, a third laser sensor device 60C may be operably engaged with the shelf 28 of the third stand 24C and electrically connected with the first controller 40A via a third electrical connection W3, and a fourth laser sensor device 60D may be operably engaged with the shelf 28 of the fourth stand 24D and electrically connected with the second controller 40B via a fourth electrical connection W4. As such, the first controller 40A is configured to control and command the first laser sensor device 60A and the third laser sensor device 60C during canard testing operations, and the second controller 40B is configured to control and command the second laser sensor device 60B and the fourth laser sensor device 60D. In the illustrated embodiment, the first laser sensor device 60A and the third laser sensor device 60C are configured to analyze and measure rotational displacement of two pitch canards of a payload, and the second laser sensor device 60B and the fourth laser sensor device 60D are configured to analyze and measure rotational displacement of two roll canards of a payload. In other exemplary embodiments, any suitable number of laser sensor devices may be provided with a LCTS for measuring rotational displacement of canards provided on a payload.

It should also be understood that the at least one laser sensor device 60 of LCTS 10 may be any commercially-available laser sensor device for measuring rotational displacement of canards of different payloads. In one example, LCTS 10 may include Keyence Laser Sensor Heads LJ-X8080 for measuring rotational displacement of canards of a payload. However, a special purpose laser sensor device may also be constructed for measuring displacement of canards.

LCTS 10 may also include a computer-readable media having a canard testing protocol 70 that is executable by the at least one laser controller 40 to command the at least one laser sensor device 60 to measure rotational displacement of at least one canard of a payload without contacting the at least one canard. The canard testing protocol 70 may be stored on the computer-readable media and executed by the at least one laser controller 40. In the illustrated embodiment, the canard testing protocol 70 is stored on the computer-readable media and is executable by the first controller 40A and the second controller 40B. As described in more detail below, the canard testing protocol 70 may include at least one set of testing instructions that is executed by the at least one laser controller 40 to command the at least one laser sensor device 60 to statically measure at least one angular angle and/or angular position of at least one canard when the at least one canard is stationary at least one angular position. As also described in more detail below, the canard testing protocol 70 may also include at least another set of testing instructions that is executable by the at least one laser controller 40 to command the at least one laser sensor device 60 to dynamically measure at least one angular angle of at least one canard when the at least one canard is moving from at least one position to at least another position.

Figure 5:
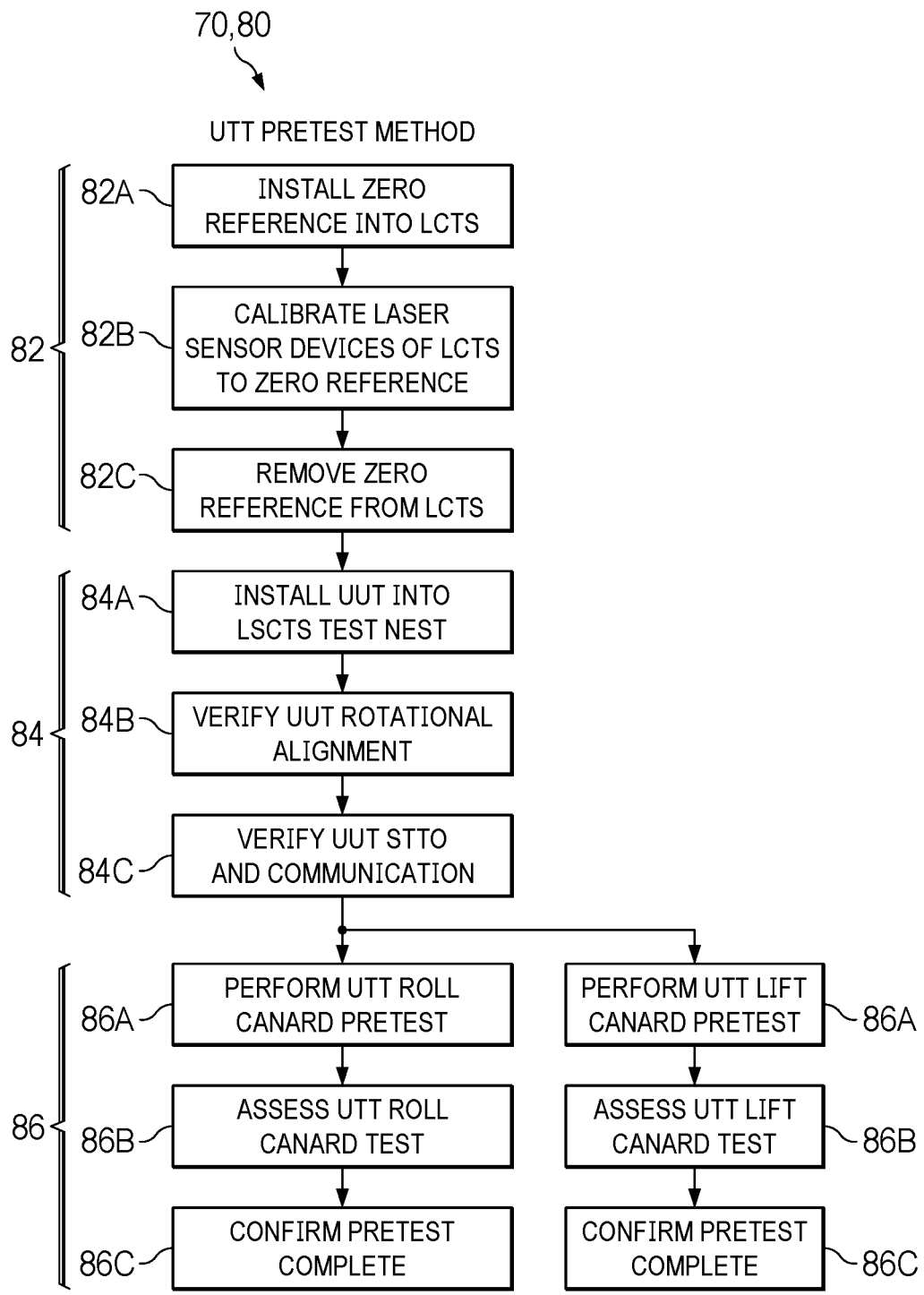
FIG. 5 (FIG. 5) is a diagrammatic view of a first testing framework of a testing protocol of LCTS.

Referring to FIG. 5, the canard testing protocol 70 may include a set of first or pretesting instructions 80 that is stored on the at least one laser controller 40 and executable by the at least one laser controller 40. As best seen in FIG. 5, the set of pretesting instructions 80 enables the LCTS 10 to calibrate the at least one laser controller 40 and the at least one laser sensor device 60 to a payload, via a zero reference payload, and to confirm the unit under test is actually suitable for testing purposes. It should be noted that the zero reference payload used herein includes zero-reference canards that are positioned at first angular positions matching the first or minimum angular positions of the canards provided on a payload being tested by LCTS 10.

As best seen in FIG. 5, the set of pretesting instructions 80 includes a first set of commands or calibration set of commands 82 that is stored on the computer readable medium of LCTS 10 and is executed by the at least one laser controller 40 and the at least one laser sensor device 60. The first set of commands 82 are executed when the at least one laser controller 40 and the at least one laser sensor device 60 are calibrated to a new payload for measuring purposes. An initial step 82A of the first set of commands 82 includes installing a zero reference payload into LCTS 10. This step 82A may be performed by an operator of LCTS 10 so that the zero reference payload is loaded into the test bench assembly 20 via the payload orientation tool 30 and the payload retaining assembly 32; such installation of the zero reference payload with the test bench assembly 20 is best seen in FIG. 4A.

Another step 82B of the first set of commands 82 executed by the at least one laser controller 40 includes calibrating the at least one laser sensor device 60 to the zero reference payload. Upon execution of step 82B, the at least one laser controller 40 commands the at least one embedded sensors 62 of the at least one laser sensor 60 to generate a light source 64 to measure a zero-reference angular angle of at least zero-reference canard provided at a zero-reference angular position. Once measured, the at least one laser sensor 60 may then output the measurement of the zero-reference angular angle to the at least one laser controller 40 for calibration purposes. Another step 82C of the first set of commands 82 includes removing the zero reference payload into LCTS 10. This step 82C may be performed by an operator of LCTS 10 so that the zero reference payload is removed from the test bench assembly 20 via the payload orientation tool 30 and the payload retaining assembly 32.

As best seen in FIG. 5, the set of pretesting instructions 80 also includes a second set of instructions or installation set of commands 84 that is stored on the computer readable medium of LCTS 10 and is executed by the at least one laser controller 40. The second set of commands 84 are executed when the at least one laser controller 40 and the at least one laser sensor device 60 are prepared to verify an installed unit under test. An initial step 84A of the second set of commands 84 includes installing a unit under test into LCTS 10. This step 84A may be performed by an operator of LCTS 10 so that the unit under test is loaded into the test bench assembly 20 via the payload orientation tool 30 and the payload retaining assembly 32; such installation of the unit under test with the test bench assembly 20 is best seen in FIG. 4B. Another step 84B of the second set of commands 84 executed by the at least one laser controller 40 includes verifying the rotational alignment of the unit under test. Another step 84C of the second set of commands 84 executed by the at least one laser controller 40 includes verifying the unit under test is safe to turn ON (or STTO) and the unit under test is enabled to communication with the LCTS 10.

As best seen in FIG. 5, the set of pretesting instructions 80 also includes a third set of instructions or installation set of commands 86 that is stored on the computer readable medium of LCTS 10 and executed by the at least one laser controller 40. The third set of commands 86 are executed when the at least one laser controller 40 and the at least one laser sensor device 60 are prepared to perform pretests on the installed unit under test. An initial step 86A of the third set of commands 84 includes performing pretest on the canards of the unit under test. In this step 86A, roll canards and lift canards of the unit under test are tested (e.g., rotational movement). Another step 86B of the third set of instructions includes assessing the pretest on the canards of the unit under test. In this step 86B, roll canards and lift canards of the unit under test are assessed by the LCTS 10 verify the roll canards and lift canards of the unit under test are functional for testing (i.e., responsive to commands from LCTS 10). Another step 86C of the third set of instructions includes confirming the canards of the unit under test are usable for testing.

Figure 7:
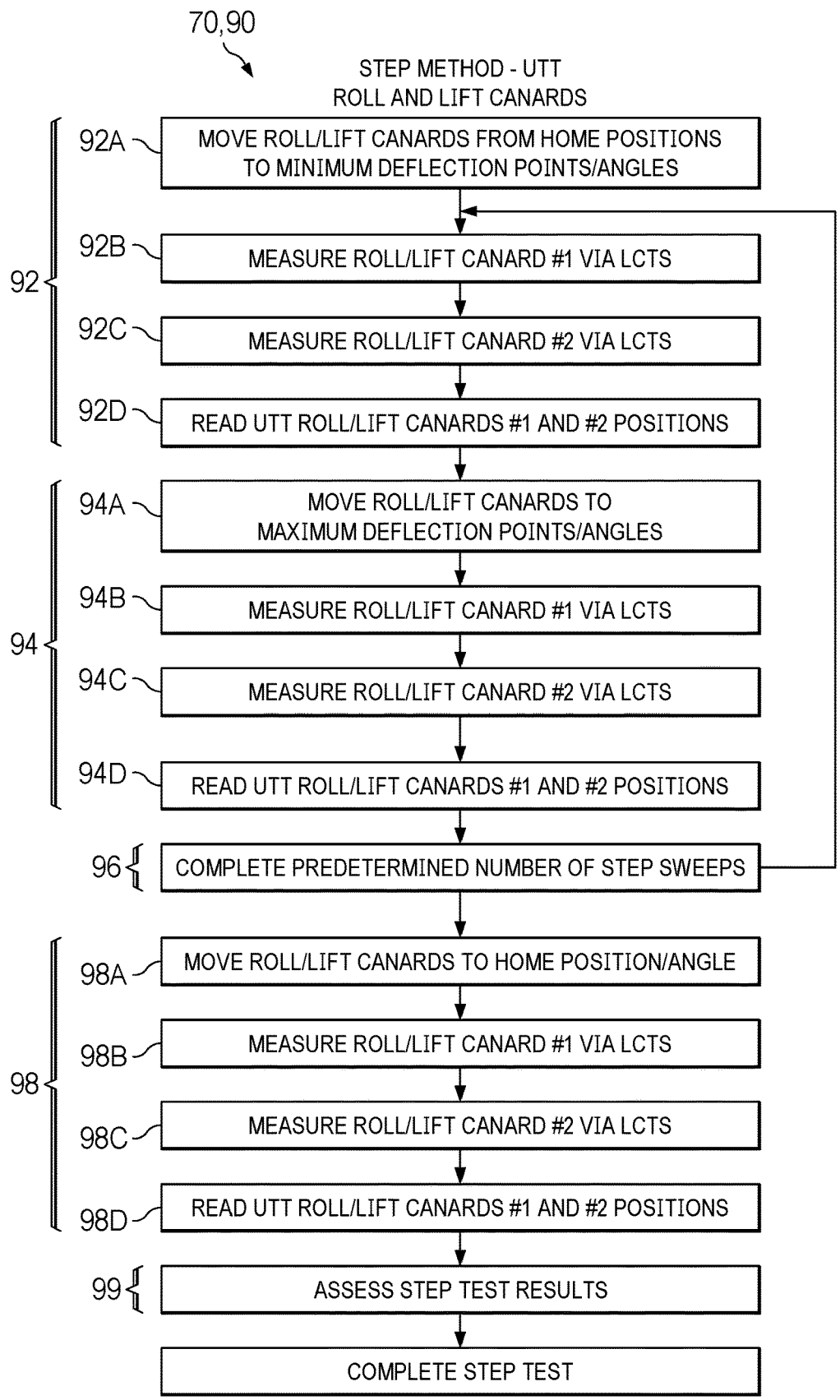
FIG. 7 (FIG. 7) is a diagrammatic flowchart of a second testing framework of the testing protocol of LCTS.

Referring to FIG. 7, the canard testing protocol 70 may include a set of second instructions or set of step testing instructions 90 that is stored on a computer readable medium in LCTS 10 and executable by the at least one laser controller 40. As best seen in FIG. 7, the set of step testing instructions 90 enables the LCTS 10 to measure movement and/or rotation of at least one canard of the unit under test from a home position to at least one angular position while statically measuring the at least one canard at the at least one angular position. As best seen in FIG. 7, the set of step testing instructions 90 also enables the LCTS 10 to measure movement and/or rotation of at least one canard of the unit under test from the at least one angular position to at least another angular position while statically measuring the at least one canard at the at least another angular position. As best seen in FIG. 7, the set of step testing instructions 90 also enables the LCTS 10 to measure movement and/or rotation of at least one canard of the unit under test from the at least another angular position back to the home position while statically measuring the at least one canard at the home position.

It should be understood that when the at least one laser controller 40 executes the set of step testing instructions 90, the at least one laser controller 40 commands the at least one laser sensor device 60 to measure movement and/or rotation of at least one canard at a single stationary angular position. Stated differently, the at least one laser sensor device 60 is only commanded by the at least one laser controller 40, via the set of step testing instructions 90, to measure the at least one canard when the at least one canard is static and/or stationary at one angular position. As such, when the at least one laser controller 40 executes the set of step testing instructions 90, the at least one laser controller 40 commands the at least one laser sensor device 60 to statically measure at least one canard when the at least one canard is stationary at a predetermined angular position.

The set of step testing instructions 90 may include a first set of step testing commands 92. As best seen in FIG. 7, an initial step 92A of the first set of step testing commands 92 includes moving canards of the unit under test from home positions to first or minimum angular positions. The unit under test is instructed to move the canards by any component and/or device LCTS 10 that is in logical communication with the unit under test, including the at least one laser controller 40.

Another step 92B of first set of step testing commands 92 may include the first controller 40A commanding one of the first laser sensor device 60A and the third laser sensor device 60C to measure at least one canard of the unit under test at the first angular position. As described previously, the set of step testing instructions 90 enables one of the first laser sensor device 60A and the third laser sensor device 60C to statically measure a first angular angle of the at least one canard of the unit under test when the at least one canard is stationary at the first angular position. As such, the at least one embedded sensors 62 of the selected first laser sensor device 60A and the third laser sensor device 60C generates a light source 64 to statically measure the first angular angle of the at least one canard of the unit under test when the at least one canard is stationary at the first angular position.

Similarly, another step 92C of first set of step testing commands 92 may include the second controller 40B commanding one of the second laser sensor device 60B and the fourth laser sensor device 60D to measure at least another canard of the unit under test at the first angular position. As described previously, the set of step testing instructions 90 enables the selected second laser sensor device 60B and the fourth laser sensor device 60D to statically measure a first angular angle of the at least another canard of the unit under test when the at least another canard is stationary at the first angular position. As such, the at least one embedded sensors 62 of the selected second laser sensor device 60B and the fourth laser sensor device 60D generates a light source 64 to statically measure the first angular angle of the at least another canard of the unit under test when the at least another canard is stationary at the first angular position.

Another step 92D of first set of step testing commands 92 may include the at least one laser controller 40 reading the first angular positions of the at least one canard and the at least another canard as executed by the unit under test via a computer readable medium originally stored on the unit under test. Here, the first controller 40A may read the first angular position of the at least one canard as executed by the unit under test via the computer readable medium originally stored on the unit under test, and the second controller 40B may read the first angular position of the at least another canard as executed by the unit under test via the computer readable medium originally stored on the unit under test. As such, this step 92D enables LCTS 10 to collect and store the first angular positions of the at least one canard of and the at least another canard as executed by the unit under test via the computer readable medium originally stored on the unit under test.

It should be understood that the first set of step testing commands 92 may enable the at least one laser controller 40 to command at least one laser sensor device 60 to measure at least one or more surfaces defined along at least one canard of a unit under test. In one instance, the at least one sensor device 60 may be commanded by the at least one laser controller 40 to measure a first or small surface defined along the canard of the unit under test. In another instance, the at least one sensor device 60 may be commanded by the at least one laser controller 40 to measure a second or large surface defined along the canard of the unit under test.

The set of step testing instructions 90 may include a second set of step testing commands 94. As best seen in FIG. 7, an initial step 94A of the second set of step testing commands 94 includes moving canards of the unit under test from the first angular positions to second or maximum angular positions. The canards of the unit under test may be moved by any component and/or device provided in LCTS 10, including the at least one laser controller 40.

Another step 94B of second set of step testing commands 94 may include the first controller 40A commanding one of the first laser sensor device 60A and the third laser sensor device 60C to measure the at least one canard of the unit under test at the second angular position. As described previously, the set of step testing instructions 90 enables the selected first laser sensor device 60A and the third laser sensor device 60C to statically measure a second angular angle of the at least one canard of the unit under test when the at least one canard is stationary at the second angular position. As such, the at least one embedded sensors 62 of the selected first laser sensor device 60A and the third laser sensor device 60C generates a light source 64 to statically measure the second angular angle of the at least one canard of the unit under test when the at least one canard is stationary at the second angular position.

Similarly, another step 94C of second set of step testing commands 94 may include the second controller 40B commanding one of the second laser sensor device 60B and the fourth laser sensor device 60D to measure the at least another canard of the unit under test at the second angular position. As described previously, the set of step testing instructions 90 enables the selected second laser sensor device 60B and the fourth laser sensor device 60D to statically measure a second angular angle of the at least another canard of the unit under test when the at least another canard is stationary at the second angular position. As such, the at least one embedded sensors 62 of the selected second laser sensor device 60B and the fourth laser sensor device 60D generates a light source 64 to statically measure the second angular angle of the at least another canard of the unit under test when the at least another canard is stationary at the second angular position.

Another step 94D of second set of step testing commands 94 may include the at least one laser controller 40 reading the second angular positions of the at least one canard and the at least another canard as executed by the unit under test via the computer readable medium originally stored on the unit under test. Here, the first controller 40A may read the second angular position of the at least one canard as executed by the unit under test via the computer readable medium originally stored on the unit under test, and the second controller 40B may read the second angular position of the at least another canard as executed by the unit under test via the computer readable medium originally stored on the unit under test. As such, this step 94D enables LCTS 10 to collect and store the second angular positions of the at least one canard of and the at least another canard as executed by the unit under test via the computer readable medium originally stored on the unit under test.

It should be understood that the second set of step testing commands 94 may also enable the at least one laser controller 40 to command at least one laser sensor device 60 to measure at least one or more surfaces defined along at least one canard of a unit under test. In one instance, the at least one sensor device 60 may be commanded by the at least one laser controller 40 to measure a first or small surface defined along the canard of the unit under test. In another instance, the at least one sensor device 60 may be commanded by the at least one laser controller 40 to measure a second or large surface defined along the canard of the unit under test.

The set of step testing instructions 90 may include a third set of step testing commands 96. As best seen in FIG. 7, the third set of step testing commands 96 enables the LCTS 10 to repeat the first set of step testing commands 92 and the second set of step testing commands 94 until the at least one canard and the at least another canard of the unit under test have been rotated a predetermined number of cycles between the first angular positions and the second angular positions and have been measured at a predetermined number of angles by the at least one laser sensor device 60 at the first angular positions and the second angular positions. In one instance, the third set of steps instructions 96 may require that the first set of step testing commands 92 and the second set of step testing commands 94 be completed when the at least one canard and the at least another canard of the unit under test have been rotated between the first angular positions and the second angular positions for three cycles and have been statically measured during these three cycles by the at least one laser sensor device 60 at the first angular positions and the second angular positions.

The set of step testing instructions 90 may include a fourth set of step testing commands 98. As best seen in FIG. 7, an initial step 98A of the fourth set of step testing commands 98 includes moving canards of the unit under test from the second angular positions to third or home positions. The canards of the unit under test may be moved by any component and/or device provided in LCTS 10, including the at least one laser controller 40.

Another step 98B of fourth set of step testing commands 98 may include the first controller 40A commanding one of the first laser sensor device 60A and the third laser sensor device 60C to measure the at least one canard of the unit under test at the home position. As described previously, the set of step testing instructions 90 enables the selected first laser sensor device 60A and the third laser sensor device 60C to statically measure a third angular angle of the at least one canard of the unit under test when the at least one canard is stationary at the home position. As such, the at least one embedded sensors 62 of the selected first laser sensor device 60A and the third laser sensor device 60C generates a light source 64 to statically measure the third angular angle of the at least one canard of the unit under test when the at least one canard is stationary at the home position.

Similarly, another step 98C of fourth set of step testing commands 98 may include the second controller 40B commanding one of the second laser sensor device 60B and the fourth laser sensor device 60D to measure the at least another canard of the unit under test at the home position. As described previously, the set of step testing instructions 90 enables the selected second laser sensor device 60B and the fourth laser sensor device 60D to statically measure a third angular angle of the at least another canard of the unit under test when the at least another canard is stationary at the home position. As such, the at least one embedded sensors 62 of the selected second laser sensor device 60B and the fourth laser sensor device 60D generates a light source 64 to statically measure the third angular angle of the at least another canard of the unit under test when the at least another canard is stationary at the home position.

Another step 98D of fourth set of step testing commands 98 may include the at least one laser controller 40 reading the home positions of the at least one canard and the at least another canard as executed by the unit under test via the computer readable medium originally stored on the unit under test. Here, the first controller 40A may read the home position of the at least one canard as executed by the unit under test via the computer readable medium originally stored on the unit under test, and the second controller 40B may read the home position of the at least another canard as executed by the unit under test via the computer readable medium originally stored on the unit under test. As such, this step 98D enables LCTS 10 to collect and store the home positions of the at least one canard of and the at least another canard as executed by the unit under test via the computer readable medium originally stored on the unit under test.

It should be understood that the fourth set of step testing commands 98 may also enable the at least one laser controller 40 to command at least one laser sensor device 60 to measure at least one or more surfaces defined along at least one canard of a unit under test. In one instance, the at least one sensor device 60 may be commanded by the at least one laser controller 40 to measure a first or small surface defined along the canard of the unit under test. In another instance, the at least one sensor device 60 may be commanded by the at least one laser controller 40 to measure a second or large surface defined along the canard of the unit under test.

The set of step testing instructions 90 may include a fifth set of step testing commands 99. As best seen in FIG. 7, the fifth set of step testing commands 99 enables the LCTS 10 to assess the first angular positions, the second angular positions, and the home positions executed by the unit under test in comparison to the first angular angles, the second angular angles, and the third angular angles measured by the LCTS 10. Such comparison between the commanded angular positions and the measured angular angles of the canards verifies if the computer readable medium executed by the unit under test rotates the canards to the correct angular positions intended by the computer readable medium executed by the unit under test.

Figure 9A:
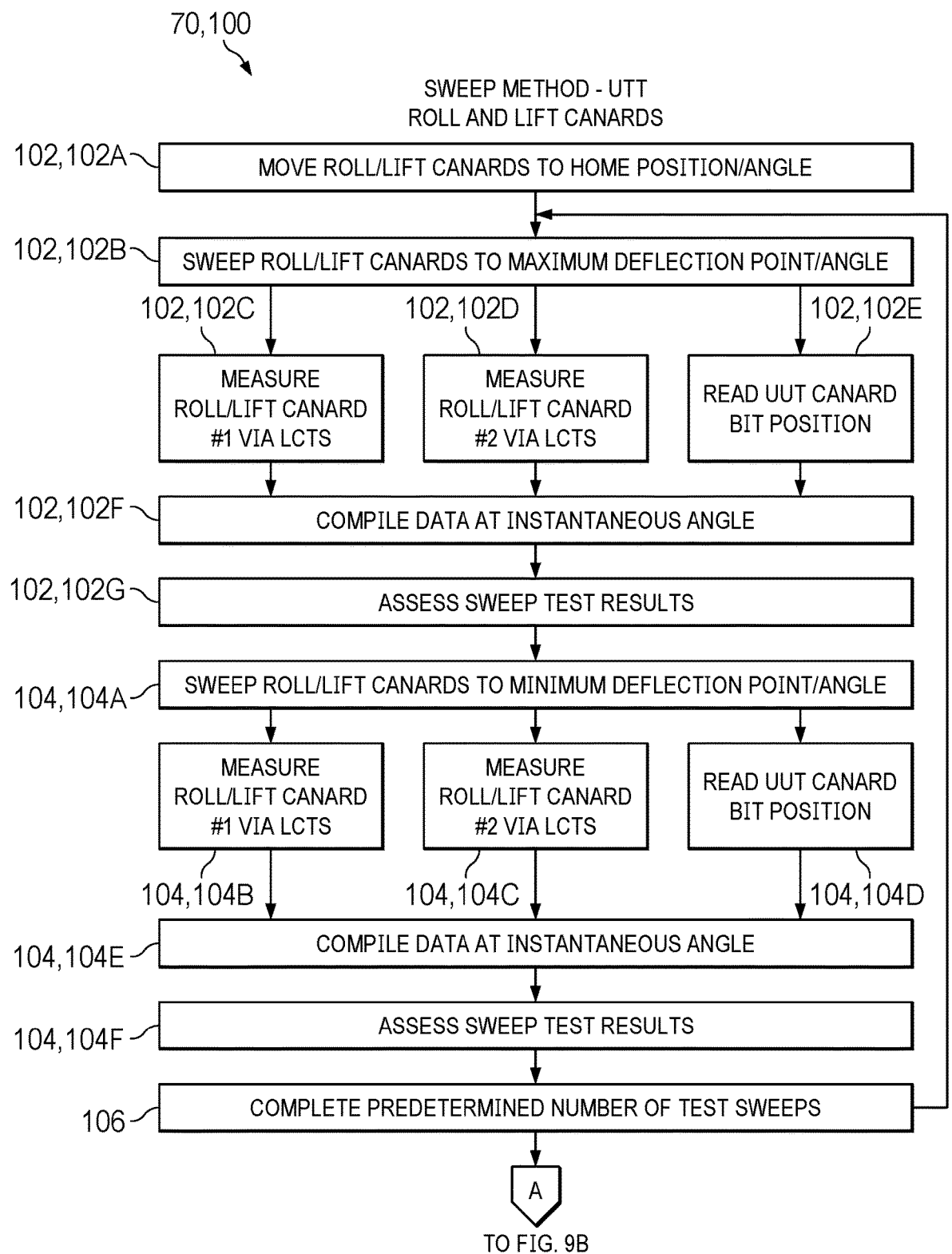
FIG. 9A (FIG. 9A) is a partial diagrammatic flowchart of a third testing framework of the testing protocol of LCTS.
Figure 9B:
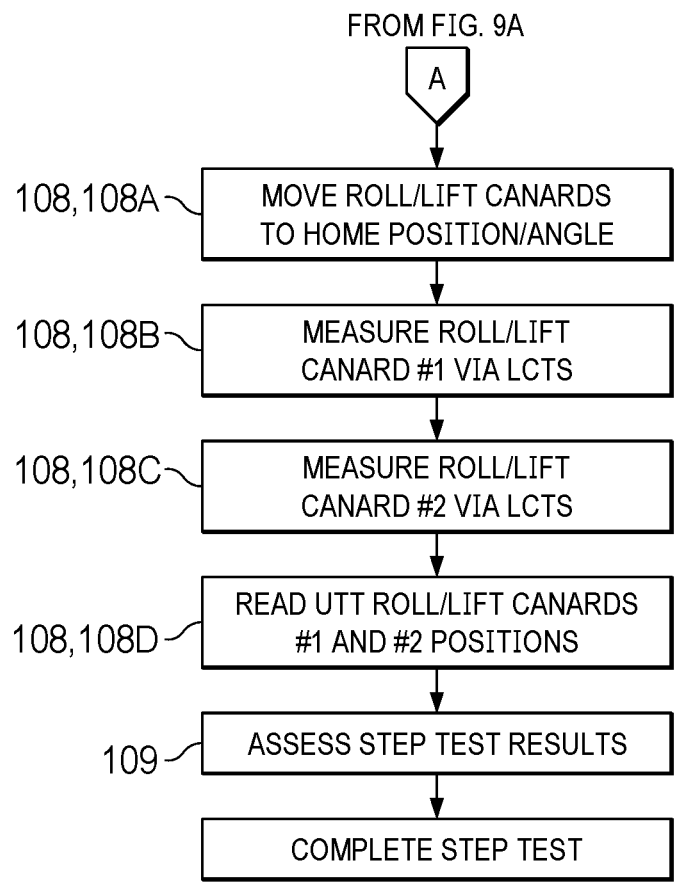
FIG. 9B (FIG. 9B) is another partial diagrammatic flowchart of the third testing framework of the testing protocol of LCTS continued from FIG. 9A.

Referring to FIG. 9A-9B, the canard testing protocol 70 may include a set of third or sweep testing instructions 100 that is stored on the at least one laser controller 40 and executable by the at least one laser controller 40. As best seen in FIG. 9A, the set of sweep testing instructions 100 enables the LCTS 10 to measure the movement and/or rotation of at least one canard of the unit under test from a home position to at least one angular position while dynamically measuring the at least one canard relative to at least one set of angular angles when the at least one canard is moving from the home position to the at least one angular position. As best seen in FIG. 9A, the set of step testing instructions 90 also enables the LCTS 10 to measure the movement and/or rotation of at least one canard of the unit under test from the at least one angular position to at least another angular position while dynamically measuring the at least one canard relative to at least another set of angular angles when the at least one canard is moving from the at least one angular position to the at least another angular position. As best seen in FIG. 9B, the set of step testing instructions 90 also enables the LCTS 10 to measure the movement and/or rotation of at least one canard of the unit under test from the at least another angular position back to the home position while dynamically measuring the at least one canard when the at least one canard is moving from the at least another angular position to the home position.

It should be understood that when the at least one laser controller 40 executes the set of sweep testing instructions 100, the at least one laser controller 40 commands the at least one laser sensor device 60 to measure movement and/or rotation of at least one canard when moving and/or rotating from at least one angular position to at least another angular position. Stated differently, the at least one laser sensor device 60 is only commanded by the at least one laser controller 40, via the set of sweep testing instructions 100, to measure the at least one canard when the at least one canard is dynamic and/or moving from between two different angular positions. As such, when the at least one laser controller 40 executes the set of sweep testing instructions 100, the at least one laser controller 40 commands the at least one laser sensor device 60 to dynamically measure at least one canard when the at least one canard is moving between predetermined angular positions.

The set of sweep testing instructions 100 may include a first set of sweep testing commands 102. As best seen in FIG. 9A, an initial step 102A of the first set of sweep testing commands 102 includes moving canards of the unit under test to the home positions. The unit under test is instructed to move the canards by any component and/or device LCTS 10 that is in logical communication with the unit under test, including the at least one laser controller 40. Another step 102B of the first set of sweep testing commands 102 includes moving canards from home positions to first or maximum angular positions. The unit under test is instructed to move the canards by any component and/or device LCTS 10 that is in logical communication with the unit under test, including the at least one laser controller 40.

Another step 102C of first set of sweep testing commands 102 may include the first controller 40A commanding one of the first laser sensor device 60A and the third laser sensor device 60C to measure at least one canard of the unit under test at a first set of angular angles as the at least one canard travels from the home position to the at least one angular position. As described previously, the set of sweep testing instructions 100 enables the selected first laser sensor device 60A and the third laser sensor device 60C to dynamically measure the first set of angular angles of the at least one canard of the unit under test as the at least one canard travels from the home position to the at least one angular position. As such, the at least one embedded sensors 62 of the selected first laser sensor device 60A and the third laser sensor device 60C generates a light source 64 to dynamically measure the first set of angular angles of the at least one canard of the unit under test as the at least one canard travels from the home position to the at least one angular position.

Similarly, another step 102D of first set of sweep testing sweep commands 102 may include the second controller 40B commanding one of the second laser sensor device 60B and the fourth laser sensor device 60D to measure at least another canard of the unit under test at a first set of angular angles as the at least another canard travels from the home position to the at least one angular position. As described previously, the set of sweep testing instructions 100 enables the selected second laser sensor device 60B and the fourth laser sensor device 60D to dynamically measure the first set of angular angles of the at least another canard of the unit under test as the at least one canard travels from the home position to the at least one angular position. As such, the at least one embedded sensors 62 of the selected second laser sensor device 60B and the fourth laser sensor device 60D generates a light source 64 to dynamically measure the first set of angular angles of the at least another canard of the unit under test when the at least one canard travels from the home position to the at least one angular position.

Another step 102E of first set of sweep testing commands 102 may include the at least one laser controller 40 reading the first angular positions of the at least one canard and the at least another canard as executed by the unit under test via a computer readable medium originally stored on the unit under test. Here, the first controller 40A may read the first angular position of the at least one canard as executed by the unit under test via the computer readable medium originally stored on the unit under test, and the second controller 40B may read the first angular position of the at least another canard as executed by the unit under test via the computer readable medium originally stored on the unit under test. As such, this step 102D enables LCTS 10 to collect and store the first angular positions of the at least one canard of and the at least another canard as executed by the unit under test via the computer readable medium originally stored on the unit under test.

Another step 102F of first set of sweep testing commands 102 may include compiling each angular angle of the first set of angular angles of the at least one canard and the at least another canard measured by the LCTS 10.

Another step 102G of the first set of sweep testing commands 102 enables the LCTS 10 to assess the first angular positions executed by the unit under test in comparison to the first angular angles measured by the LCTS 10. Such comparison between the commanded angular positions and the measured angular angles of the canards verifies if the computer readable medium executed by the unit under test rotates the canards to the correct angular positions intended by the computer readable medium executed by the unit under test.

It should be understood that the first set of sweep testing commands 102 may also enable the at least one laser controller 40 to command at least one laser sensor device 60 to measure at least one or more surfaces defined along at least one canard of a unit under test. In one instance, the at least one sensor device 60 may be commanded by the at least one laser controller 40 to measure a first or small surface defined along the canard of the unit under test. In another instance, the at least one sensor device 60 may be commanded by the at least one laser controller 40 to measure a second or large surface defined along the canard of the unit under test.

The set of sweep testing instructions 100 may include a second set of sweep testing commands 104. As best seen in FIG. 9A, an initial step 104A of the first set of sweep testing commands 104 includes moving canards of the unit under test from first angular positions to second or minimum angular positions. The unit under test is instructed to move the canards by any component and/or device LCTS 10 that is in logical communication with the unit under test, including the at least one laser controller 40.

Another step 104B of second set of sweep testing commands 104 may include the first controller 40A commanding one of the first laser sensor device 60A and the third laser sensor device 60C to measure the at least one canard of the unit under test at a second set of angular angles as the at least one canard travels from the at least one angular position to at least another angular position. As described previously, the set of sweep testing instructions 100 enables one of the first laser sensor device 60A and the third laser sensor device 60C to dynamically measure the second set of angular angles of the at least one canard of the unit under test when the at least one canard travels from the at least one angular position to the at least another angular position. As such, the at least one embedded sensors 62 of the selected first laser sensor device 60A and the third laser sensor device 60C generates a light source 64 to dynamically measure the first set of angular angles of the at least one canard of the unit under test when the at least one canard travels from the at least one angular position to the at least another angular position.

Similarly, another step 104C of second set of sweep testing commands 104 may include the second controller 40B commanding one of the second laser sensor device 60B and the fourth laser sensor device 60D to measure the at least another canard of the unit under test at a second set of angular angles as the at least another canard travels from the at least one angular position to at least another angular position. As described previously, the set of sweep testing instructions 100 enables one of the second laser sensor device 60B and the fourth laser sensor device 60D to dynamically measure the second set of angular angles of the at least another canard of the unit under test when the at least another canard travels from the at least one angular position to the at least another angular position. As such, the at least one embedded sensors 62 of the selected second laser sensor device 60B and the fourth laser sensor device 60D generates a light source 64 to dynamically measure the second set of angular angles of the at least another canard of the unit under test when the at least another canard travels from the at least one angular position to the at least another angular position.

Another step 104D of second set of sweep testing commands 104 may include the at least one laser controller 40 reading the second angular positions of the at least one canard and the at least another canard as executed by the unit under test via a computer readable medium originally stored on the unit under test. Here, the first controller 40A may read the second angular position of the at least one canard as executed by the unit under test via the computer readable medium originally stored on the unit under test, and the second controller 40B may read the second angular position of the at least another canard as executed by the unit under test via the computer readable medium originally stored on the unit under test. As such, this step 102D enables LCTS 10 to collect and store the first angular positions of the at least one canard of and the at least another canard as executed by the unit under test via the computer readable medium originally stored on the unit under test.

Another step 104E of second set of sweep testing commands 104 may include compiling each angular angle of the second set of angular angles of the at least one canard and the at least another canard measured by the LCTS 10.

Another step 104F of the second set of sweep testing commands 104 enables the LCTS 10 to assess the second angular positions executed by the unit under test in comparison to the second angular angles measured by the LCTS 10. Such comparison between the commanded angular positions and the measured angular angles of the canards verifies if the computer readable medium executed by the unit under test rotates the canards to the correct angular positions intended by the computer readable medium executed by the unit under test.

It should be understood that the second set of sweep testing commands 104 may also enable the at least one laser controller 40 to command at least one laser sensor device 60 to measure at least one or more surfaces defined along at least one canard of a unit under test. In one instance, the at least one sensor device 60 may be commanded by the at least one laser controller 40 to measure a first or small surface defined along the canard of the unit under test. In another instance, the at least one sensor device 60 may be commanded by the at least one laser controller 40 to measure a second or large surface defined along the canard of the unit under test.

The set of sweep testing instructions 100 may include a third set of sweep testing commands 106. As best seen in FIG. 9A, the third set of sweep testing commands 106 enables the LCTS 10 to repeat the first set of sweep testing commands 102 and the second set of sweep testing commands 104 until the at least one canard and the at least another canard of the unit under test have been rotated a predetermined number of sweep cycles between the first angular positions and the second angular positions and have been dynamically measured at a predetermined number of angles by the at least one laser sensor device 60 at the first angular positions and the second angular positions. In one instance, the third set of sweep testing commands 106 may require that the first set of sweep testing commands 102 and the second set of sweep testing commands 104 be completed when the at least one canard and the at least another canard of the unit under test have been rotated between the first angular positions and the second angular positions for three cycles and have been dynamically measured at these three cycles by the at least one laser sensor device 60 at the first angular positions and the second angular positions.

The set of sweep testing instructions 100 may include a fourth set of sweep testing commands 108. As best seen in FIG. 9B, an initial step 108A of the fourth set of sweep testing commands 108 includes moving canards of the unit under test from the second angular positions to third or home positions. The canards of the unit under test may be moved by any component and/or device provided in LCTS 10, including the at least one laser controller 40.

Another step 108B of fourth set of sweep testing commands 108 may include the first controller 40A commanding one of the first laser sensor device 60A and the third laser sensor device 60C to measure the at least one canard of the unit under test at a third set of angular angles as the at least one canard travels from the at least another angular position to the home position. As described previously, the set of sweep testing instructions 100 enables the selected first laser sensor device 60A and the third laser sensor device 60C to dynamically measure a third set of angular angles of the at least one canard of the unit under test as the at least one canard travels from the at least another angular position to the home position. As such, the at least one embedded sensors 62 of the selected first laser sensor device 60A and the third laser sensor device 60C generates a light source 64 to dynamically measure the third set of angular angles of the at least one canard of the unit under test when the at least one canard travels from the at least another angular position to the home position.

Similarly, another step 108C of fourth set of sweep testing commands 108 may include the second controller 40B commanding one of the second laser sensor device 60B and the fourth laser sensor device 60D to measure the at least another canard of the unit under test as the at least one canard travels from the at least another angular position to the home position. As described previously, the set of sweep testing instructions 100 enables the selected second laser sensor device 60B and the fourth laser sensor device 60D to dynamically measure a third angular angle of the at least another canard of the unit under test as the at least another canard travels from the at least another angular position to the home position. As such, the at least one embedded sensors 62 of the selected second laser sensor device 60B and the fourth laser sensor device 60D generates a light source 64 to dynamically measure the third angular angle of the at least another canard of the unit under test as the at least another canard travels from the at least another angular position to the home position.

Another step 108D of fourth set of sweep testing commands 108 may include the at least one laser controller 40 reading the home positions of the at least one canard and the at least another canard as executed by the unit under test via the computer readable medium originally stored on the unit under test. Here, the first controller 40A may read the home position of the at least one canard as executed by the unit under test via the computer readable medium originally stored on the unit under test, and the second controller 40B may read the home position of the at least another canard as executed by the unit under test via the computer readable medium originally stored on the unit under test. As such, this step 108D enables LCTS 10 to collect and store the home positions of the at least one canard of and the at least another canard as executed by the unit under test via the computer readable medium originally stored on the unit under test.

Another step 108E of fourth set of sweep testing commands 108 may include compiling each angular angle of the third set of angular angles of the at least one canard and the at least another canard measured by the LCTS 10.

It should be understood that the fourth set of sweep testing commands 108 may also enable the at least one laser controller 40 to command at least one laser sensor device 60 to measure at least one or more surfaces defined along at least one canard of a unit under test. In one instance, the at least one sensor device 60 may be commanded by the at least one laser controller 40 to measure a first or small surface defined along the canard of the unit under test. In another instance, the at least one sensor device 60 may be commanded by the at least one laser controller 40 to measure a second or large surface defined along the canard of the unit under test.

Having now described and illustrated the LCTS 10, methods of measuring canards of a unit under test free from contacting the canards are described in more detail below.

Prior to testing canards of a specific payload, an operator of LCTS 10 may operably engage a zero-reference unitunder-test (UUT) 120 with the test bench assembly 20 via the payload orientation tool 30 and the payload retaining assembly 32. As best seen in FIG. 4A, the zero-reference UUT 120 is configured with a set of canards 122 where each canard of the set of canards 122 is defined at a first angular position relative to a home position. The first angular position of each canard of the set of canards 122 matches a first angular position of each canard of a set of canards of a unit under test in order to calibrate the LCTS 10 with the unit under test. Once engaged, an operator may select the LCTS 10 to execute the a first set of instructions 80 of the canard testing protocol 70 to calibrate the at least one laser controller 40 and the at least one laser sensor device 60 with the zero-reference UUT 120. As best seen in FIG. 4A, the first laser sensor device 60A and the second laser sensor device 60B are commanded by the first controller 40A and the second controller 40B to emit light sources 64, via the at least embedded sensors 62, to measure a first canard 122A of the zero-reference UUT 120 and a second canard 122B of the zero-referenced UTT 120. While not illustrated herein, the third laser sensor device 60C and the fourth laser sensor device 60D are also commanded by the first controller 40A and the second controller 40B to emit light sources 64, via the at least embedded sensors 62, to measure a third canard 122C of the zero-reference UUT 120 and a fourth canard (not illustrated) of the zero-referenced UTT 120. Once calibrated, the operator may then remove the zero-reference unit 120 from the payload orientation tool 30 and the payload retaining assembly 32 of test bench assembly 20.

The operator of LCTS 10 may then operably engage a unit under test (UUT) 130 with the test bench assembly 20 via the payload orientation tool 30 and the payload retaining assembly 32. As best seen in FIG. 4B, UUT 130 is configured with a set of canards 132 where each canard of the set of canards 132 is configured to rotate between a first or minimum angular position (see FIG. 6A) and a second or maximum angular position (see FIG. 6B) relative to a home position (see FIG. 6C). Once engaged, an operator may select the LCTS 10 to execute the a first set of instructions 80 of the canard testing protocol 70 to verify rotational alignment of UUT 130, to verify safe to turn ON (STTO) of UUT 130, and to verify communication between LCTS 10 and UUT 130. The a first set of instructions 80 of the canard testing protocol 70 may then be executed to enable the UUT 130 to perform pretest of the set of canards 132. The a first set of instructions 80 of the canard testing protocol 70 may then be executed to enable LCTS 10 to assess and confirm the set of canards 132 is functional prior to executing one of the set of step testing instructions 90 and the set of sweep testing instructions 100.

Figure 6A:
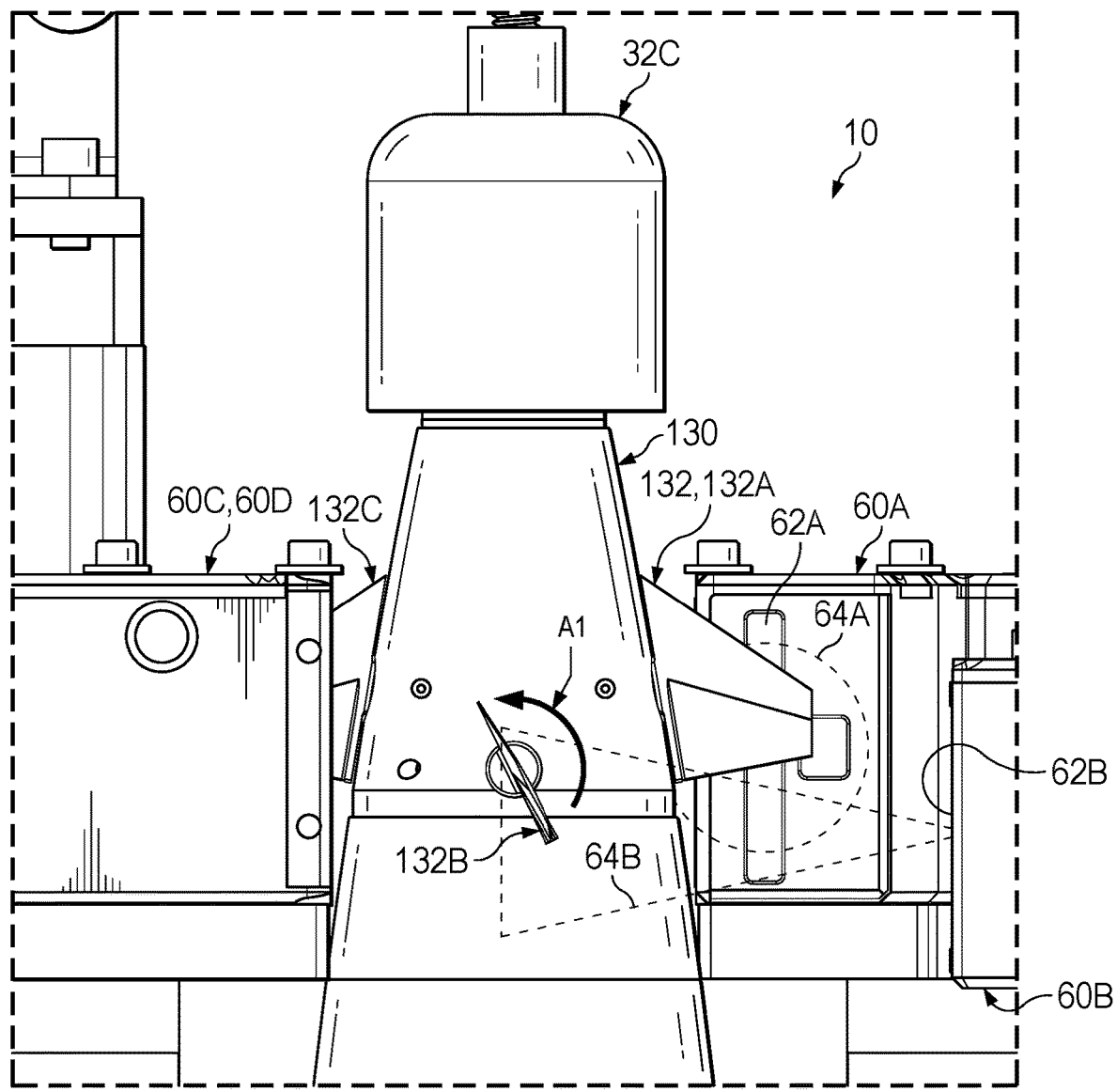
FIG. 6A (FIG. 6A) is an operational view of LCTS, wherein the at least one canard of the unit under test is rotated from a home position to a first angular position and the at least one laser sensor device measures the at least one canard at the first angular position.

In one instance, the operator of LCTS 10 may select the set of step testing instructions 90 of the canard testing protocol 70 to be executed for testing rotary displacement of each canard of the set of canards 132 of the UUT 130. As best seen in FIG. 6A, UUT 130 is instructed by the LCTS 10 to rotate the first canard 132A and a second canard 132B of the set of canards 132 from the home positions to the first angular positions; such rotational movement of the second canard 132B is denoted by an arrow label A1 in FIG. 6A. Once the first canard 132A and the second canard 132B are rotated to the first angular positions, the first laser sensor device 60A is commanded by the first controller 40A to statically measure a first angular angle of the first canard 132A when provided at the first angular position. As such, the first laser sensor device 60A emits a light source 64A, via the at least one embedded sensors 62, to statically measure a first angular angle of the first canard 132A without contacting the first canard 132A. Similarly, the second laser sensor device 60B is commanded by the second controller 40B to measure a first angular angle of the second canard 132B when provided at the first angular position. As such, the second laser sensor device 60B also emits a light source 64B, via the at least one embedded sensors 62, to measure a first angular angle of the second canard 132B without contacting the second canard 132B. While not illustrated herein, this process is also performed by third laser sensor device 60C and the fourth laser sensor device 60D for the third canard 132C and the fourth canard.

Figure 6B:
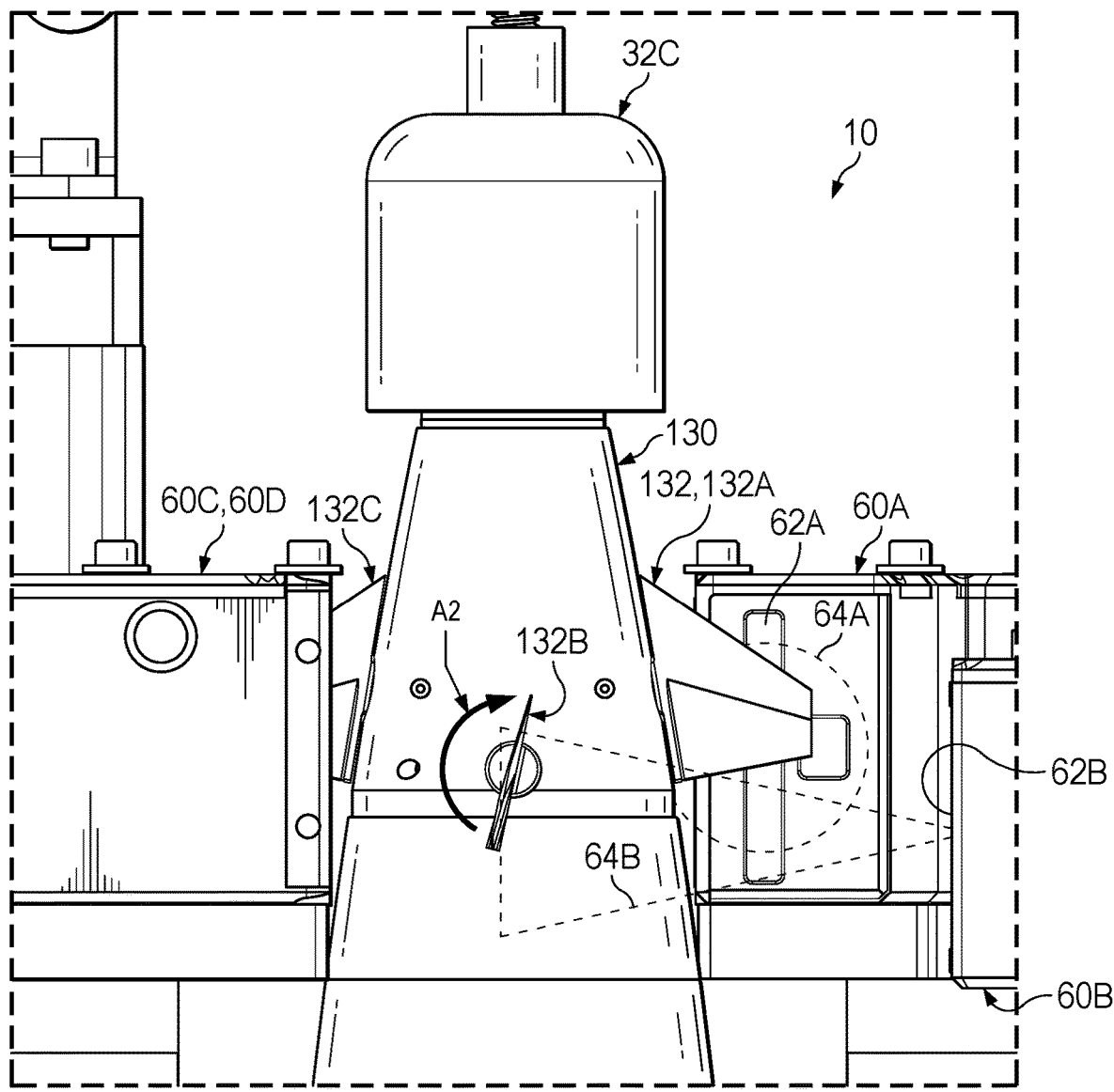
FIG. 6B (FIG. 6B) is an operational view of LCTS similar to FIG. 6A, but the at least one canard of the unit under test is rotated from the first angular position to a second angular position and the at least one laser sensor device measures the at least one canard at the second angular position.
Figure 6C:
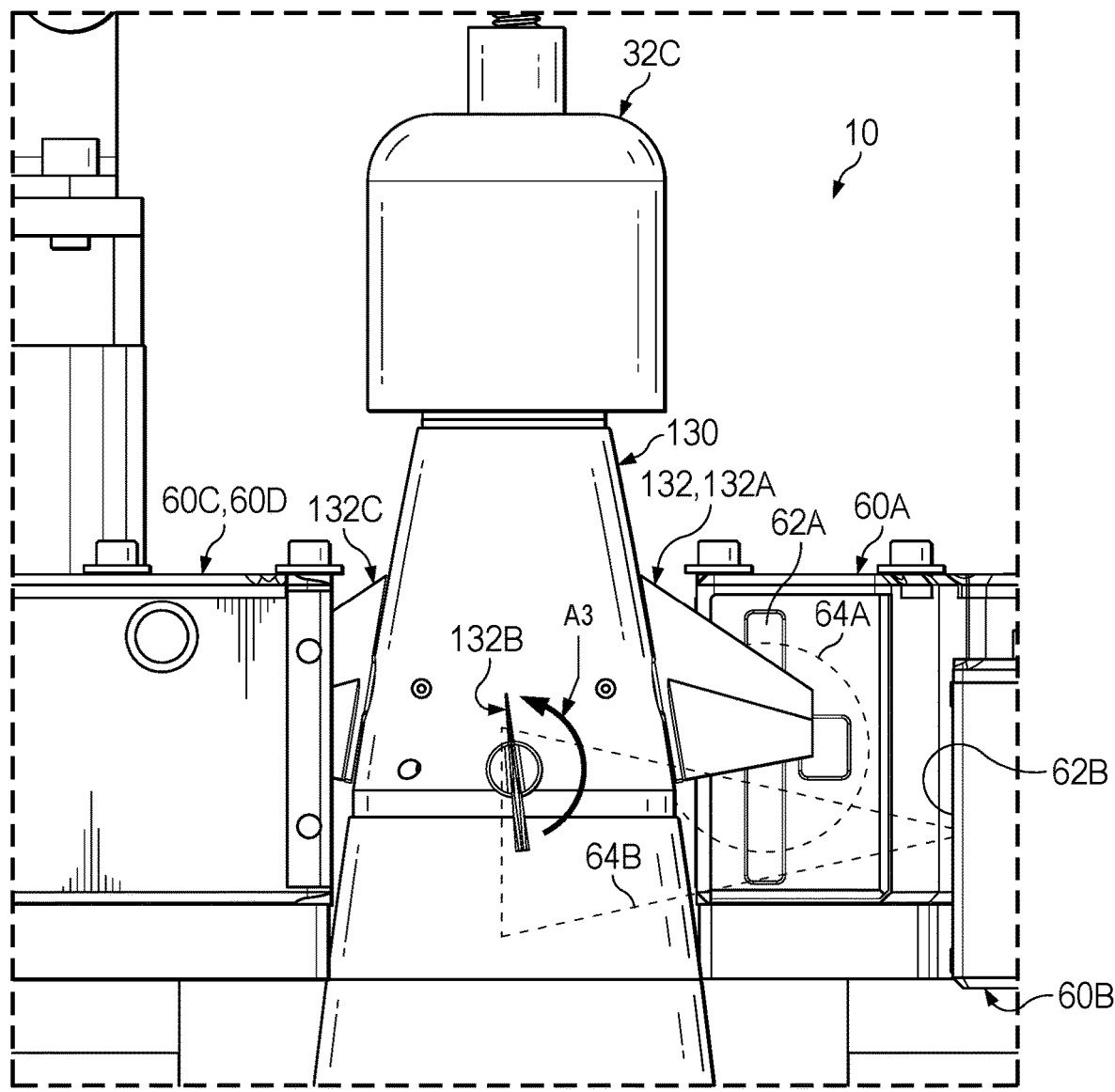
FIG. 6C (FIG. 6C) is an operational view of LCTS similar to FIG. 6B, but the at least one canard of the unit under test is rotated from the second angular position to the home position and the at least one laser sensor device measures the at least one canard at the home position.

As best seen in FIG. 6B, UUT 130 may also be instructed by the LCTS 10 to rotate the first canard 132A and the second canard 132B of the set of canards 132 from the first angular positions to second angular positions; such rotational movement of the second canard 132B is denoted by an arrow label A2 in FIG. 6B. Once the first canard 132A and the second canard 132B are rotated to the second angular positions, the first laser sensor device 60A is commanded by the first controller 40A to statically measure a second angular angle of the first canard 132A when provided at the second angular position. As such, the first laser sensor device 60A emits another light source 64A, via the at least one embedded sensors 62, to measure a second angular angle of the first canard 132A without contacting the first canard 132A. Similarly, the second laser sensor device 60B is commanded by the second controller 40B to statically measure a second angular angle of the second canard 132B when provided at the second angular position. As such, the second laser sensor device 60B also emits a light source 64B, via the at least one embedded sensors 62, to measure a second angular angle of the second canard 132B without contacting the second canard 132B. While not illustrated herein, this process is also performed by third laser sensor device 60C and the fourth laser sensor device 60D for the third canard 132C and the fourth canard.

Based on the set of step testing instructions 90 of the canard testing protocol 70, LCTS 10 may instruct UUT 130 to rotate the set of canards 132 between first angular positions to second angular positions a predetermined number of cycles and/or operations. As such, the laser sensor devices 60A, 60B, 60C, 60D may be instructed by the first controller 40A and the second controller 40B to statically measure the set of canards 132 a predetermined number of cycles and/or operations when rotating between first angular positions to second angular positions based on the predetermined number of cycles and/or operations. In one instance, the first laser sensor device 60A may be commanded by the first controller 40A to measure the first canard 132A between the first angular position (see FIG. 6A) to the second angular position (see FIG. 6B) at least three measuring cycles. In this same instance, the second laser sensor device 60B may be commanded by the second controller 40B to measure the second canard 132B between the first angular position (see FIG. 6A) to the second angular position (see FIG. 6B) at for least three measuring cycles.

Once the predetermined number of cycles are complete, LCTS 10 may then instruct UUT 130 to rotate the set of canards 132 to the home positions (FIG. 6C) per the set of step testing instructions 90. As such, the laser sensor devices 60A, 60B, 60C, 60D may be instructed by the first controller 40A and the second controller 40B to statically measure the set of canards 132 when each canard is rotated to the home position. In one instance, the first laser sensor device 60A is commanded by the first controller 40A to statically measure a third or home angular angle of the first canard 132A when provided at the home position. As such, the first laser sensor device 60A emits another light source 64A, via the at least one embedded sensors 62, to statically measure a third angular angle of the first canard 132A without contacting the first canard 132A. Similarly, the second laser sensor device 60B is commanded by the second controller 40B to statically measure a third or home angular angle of the second canard 132B when provided at the third angular position. As such, the second laser sensor device 60B also emits a light source 64B, via the at least one embedded sensors 62, to statically measure a third angular angle of the second canard 132B without contacting the second canard 132B.

In the set of step testing instructions 90, LCTS 10 may then read the first angular positions, the second angular positions, and the third angular positions of the set of canards 132 as executed by UUT 130 via the computer readable medium originally stored on the UUT 130. Once the first angular positions, the second angular positions, and the third angular positions of the set of canards 132 are read, LCTS 10 may assess the first angular positions, the second angular positions, and the third angular positions as executed by the UUT 130 and compare the first angular positions, the second angular positions, and the third angular positions with the first angular angles, the second angular angles, and the third angular angles measured by the laser sensor devices 60A, 60B, 60C, 60D. Such assessment is utilized to determine the accuracy of the first angular positions, the second angular positions, and the third angular positions as executed by the UUT 130. The canard testing protocol 70 enables the laser sensor devices 60A, 60B, 60C, 60D to accurately measure the angular angle of each canard of the set of canards 132 with a standard deviation of +/−0.02 degrees to determine if the set of canards 132 are accurately commanded to the correct angular angle via the via the computer readable medium originally stored on the UUT 130.

Figure 8A:
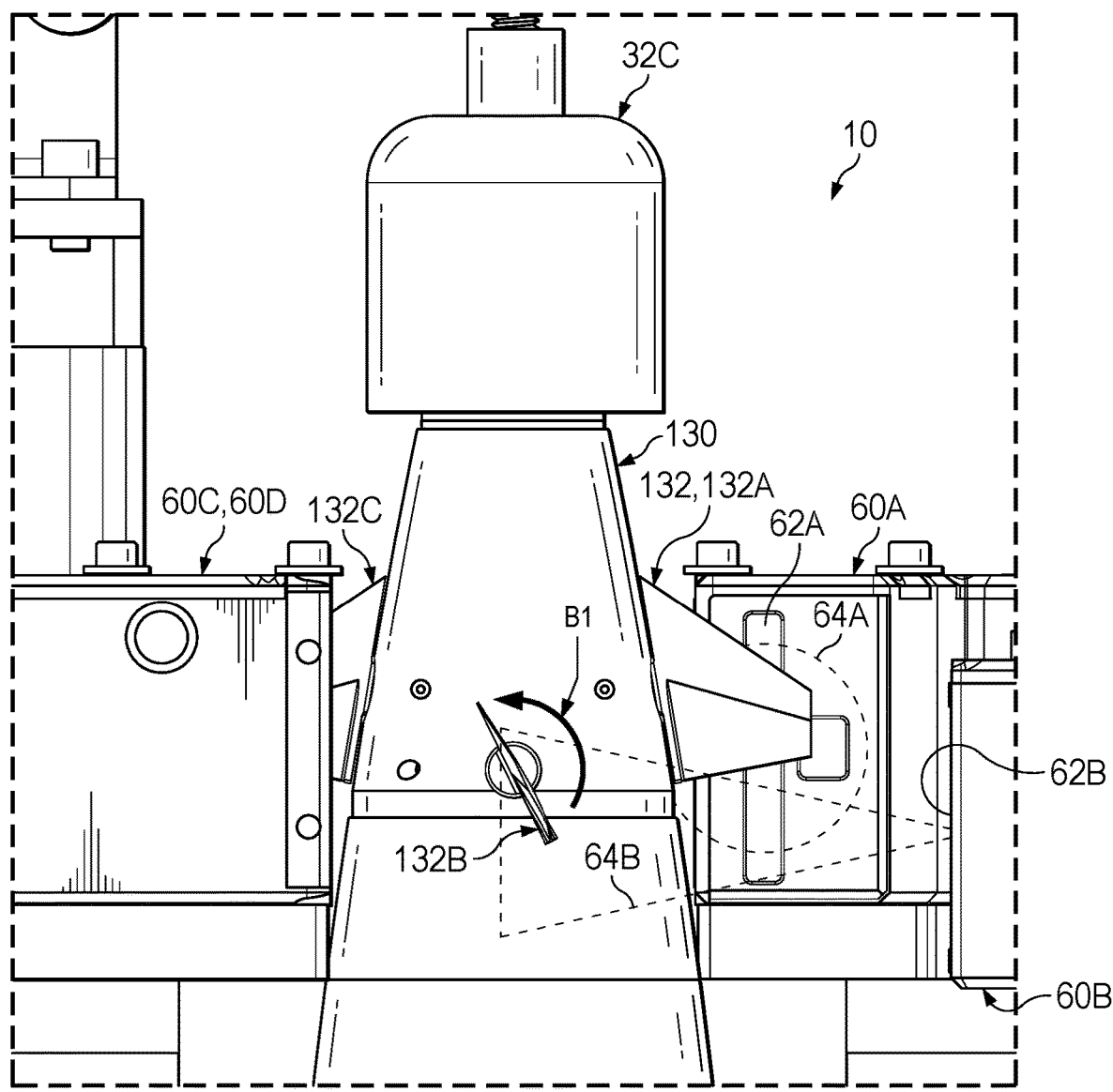
FIG. 8A (FIG. 8A) is an operational view of LCTS, wherein the at least one laser sensor device measures the at least one canard as the at least one canard moves from a home position to a first angular position.

In another instance, the operator of LCTS 10 may select the set of sweep testing instructions 100 of the canard testing protocol 70 to be executed for testing rotary displacement of each canard of the set of canards 132 of the UUT 130. As best seen in FIG. 8A, UUT 130 is instructed by the LCTS 10 to rotate the first canard 132A and a second canard 132B of the set of canards 132 from the home positions to the first angular positions; such rotational movement of the second canard 132B is denoted by an arrow label B1 in FIG. 8A. As the first canard 132A and the second canard 132B are rotating from the home positions to the first angular positions, the first laser sensor device 60A is commanded by the first controller 40A to dynamically measure a first set of angular angles of the first canard 132A as the first canard 132A is rotated from the home position to the first angular position. As such, the first laser sensor device 60A emits a light source 64A, via the at least one embedded sensors 62, to dynamically measure a first set of angular angles of the first canard 132A without contacting the first canard 132A as the first canard 132A is rotated from the home position to the first angular position. Similarly, the second laser sensor device 60B is commanded by the second controller 40B to dynamically measure a first set of angular angles of the second canard 132B when the second canard 132B is rotated from the home position to the first angular position. As such, the second laser sensor device 60B also emits a light source 64B, via the at least one embedded sensors 62, to measure a first set of angular angles of the second canard 132B without contacting the second canard 132B as the first canard 132A is rotated from the home position to the first angular position.

Figure 8B:
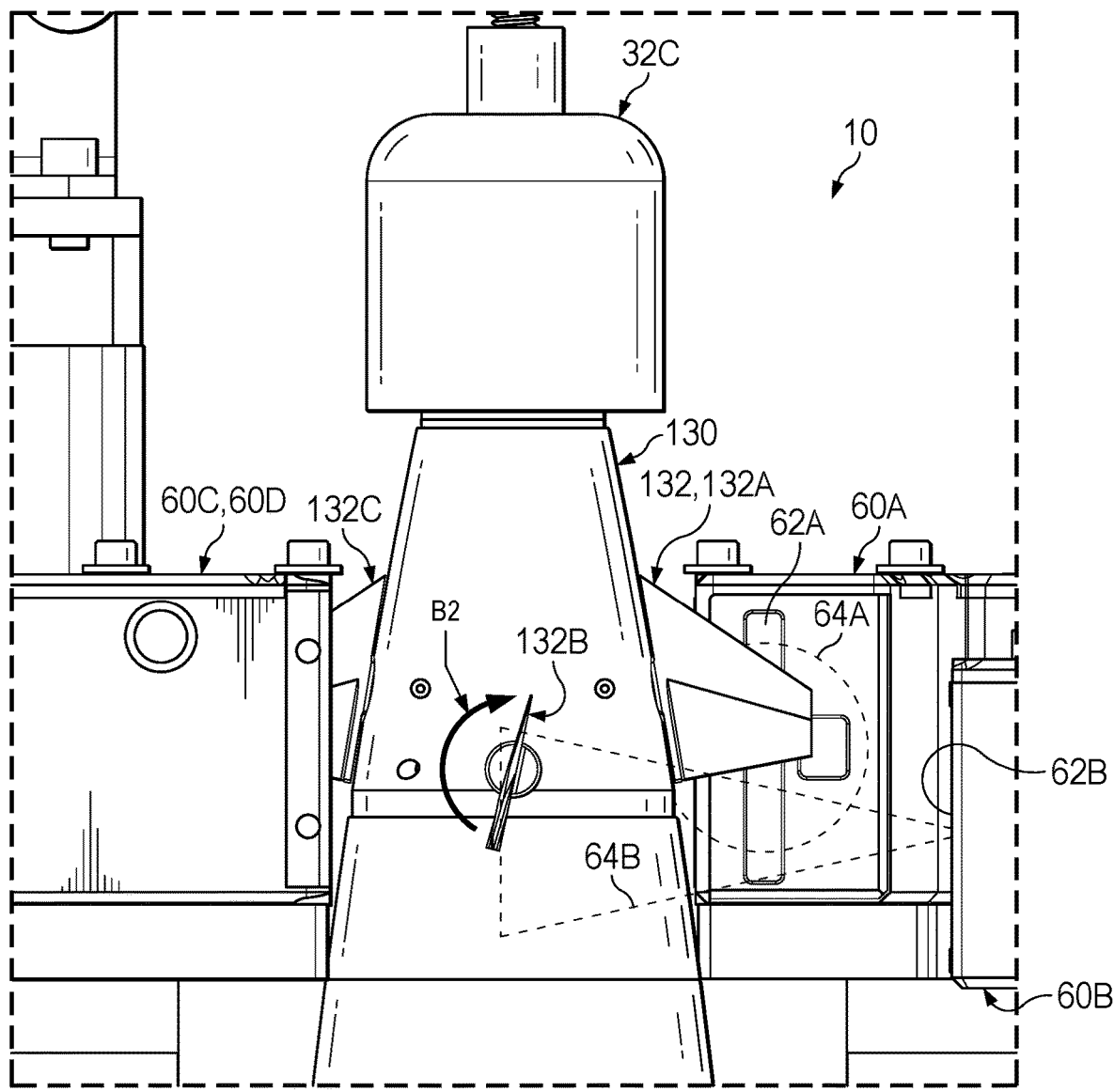
FIG. 8B (FIG. 8B) is an operational view of LCTS similar to FIG. 8A, but the at least one laser sensor device measures the at least one canard as the at least one canard moves from the first angular position to a second angular position.
Figure 8C:
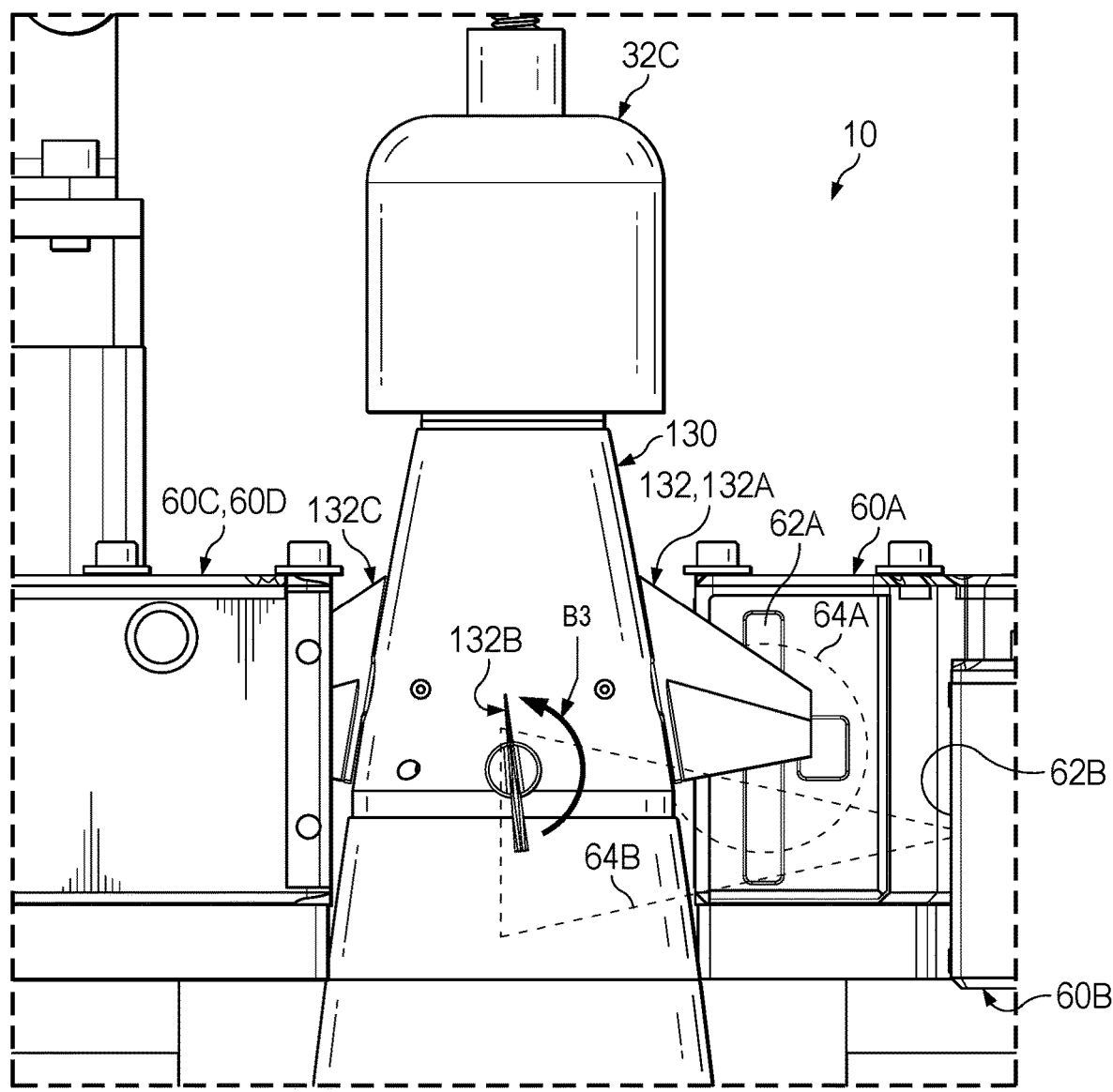
FIG. 8C (FIG. 8C) is an operational view of LCTS similar to FIG. 8B, but the at least one laser sensor device measures the at least one canard as the at least one canard moves from the second angular position to the home position.

As best seen in FIG. 8B, UUT 130 may also be instructed by the LCTS 10 to rotate the first canard 132A and the second canard 132B of the set of canards 132 from the first angular positions to second angular positions; such rotational movement of the second canard 132B is denoted by an arrow label B2 in FIG. 8B. As the first canard 132A and the second canard 132B are rotating from the first angular positions to the second angular positions, the first laser sensor device 60A is commanded by the first controller 40A to dynamically measure a second set of angular angles of the first canard 132A as the first canard 132A moves from the first angular position to the second angular position. As such, the first laser sensor device 60A emits another light source 64A, via the at least one embedded sensors 62, to dynamically measure the second set of angular angles of the first canard 132A without contacting the first canard 132A. Similarly, the second laser sensor device 60B is commanded by the second controller 40B to dynamically measure a second set of angular angles of the second canard 132B as the second canard 132B moves from the first angular position to the second angular position. As such, the second laser sensor device 60B also emits a light source 64B, via the at least one embedded sensors 62, to measure the second set of angular angles of the second canard 132B without contacting the second canard 132B.

Based on the set of step testing instructions 90 of the canard testing protocol 70, LCTS 10 may instruct UUT 130 to rotate the set of canards 132 between first angular positions to second angular positions a predetermined number of cycles and/or operations. As such, the laser sensor devices 60A, 60B, 60C, 60D may be instructed by the first controller 40A and the second controller 40B to dynamically measure the set of canards 132 a predetermined number of cycles and/or operations when rotating between first angular positions to second angular positions based on the predetermined number of cycles and/or operations. In one instance, the first laser sensor device 60A may be commanded by the first controller 40A to dynamically measure the first canard 132A between the first angular position to the second angular position at least three measuring cycles. In this same instance, the second laser sensor device 60B may be commanded by the second controller 40B to dynamically measure the second canard 132B between the first angular position (see FIG. 8A) to the second angular position (see FIG. 8B) at for least three measuring cycles.

Once the predetermined number of cycles are complete, LCTS 10 may then instruct UUT 130 to rotate the set of canards 132 to the home positions (FIG. 8C) per the set of step testing instructions 90. As such, the laser sensor devices 60A, 60B, 60C, 60D may be instructed by the first controller 40A and the second controller 40B to dynamically measure the set of canards 132 as each canard 132 of UUT 130 rotates from the second angular positions to the home positions. In one instance, the first laser sensor device 60A is commanded by the first controller 40A to dynamically measure a third or home set of angular angles of the first canard 132A as the first canard 132A moves from the second angular position to the home position. As such, the first laser sensor device 60A emits another light source 64A, via the at least one embedded sensors 62, to dynamically measure a third set of angular angles of the first canard 132A without contacting the first canard 132A. Similarly, the second laser sensor device 60B is commanded by the second controller 40B to dynamically measure a third or home set angular angles of the second canard 132B as the second canard 132B moves from the second angular position to the home position. As such, the second laser sensor device 60B also emits a light source 64B, via the at least one embedded sensors 62, to dynamically measure a third set of angular angles of the second canard 132B without contacting the second canard 132B.

In the set of sweep testing instructions 100, LCTS 10 may then read the first angular positions, the second angular positions, and the third angular positions of the set of canards 132 as executed by UUT 130 via the computer readable medium originally stored on the UUT 130. Once the first angular positions, the second angular positions, and the third angular positions of the set of canards 132 are read, LCTS 10 may assess the first angular positions, the second angular positions, and the third angular positions as executed by the UUT 130 and compare the first angular positions, the second angular positions, and the third angular positions with the compiled first set of angular angles, the complied second set of angular angles, and the complied third set of angular angles measured by the laser sensor devices 60A, 60B, 60C, 60D. Such assessment is utilized to determine the accuracy of the first angular positions, the second angular positions, and the third angular positions as executed by the UUT 130. The canard testing protocol 70 enables the laser sensor devices 60A, 60B, 60C, 60D to accurately measure the angular angle of each canard of the set of canards 132 with a standard deviation of +/−0.02 degrees to determine if the set of canards 132 are accurately commanded to the correct angular angle.

It should be understood that LCTS 10 may include additional components and parts that enables at least one laser sensor source 60 to measure and analyze at least two or more canard of a unit under test. In one example, LCTS described and illustrated herein may include a track system that enables at least one laser sensor source to rotate and/or travel between at least two canards of a unit under test for measuring the at least two or more canards of the unit under test. In this example, stands (e.g., stands 24) of LCTS may include a carriage member that rides along a rail or track member provided on the base table (e.g., base table 22) to enable the at least one laser sensor source to measure the at least two or more canards of the unit under test.

Figure 10:
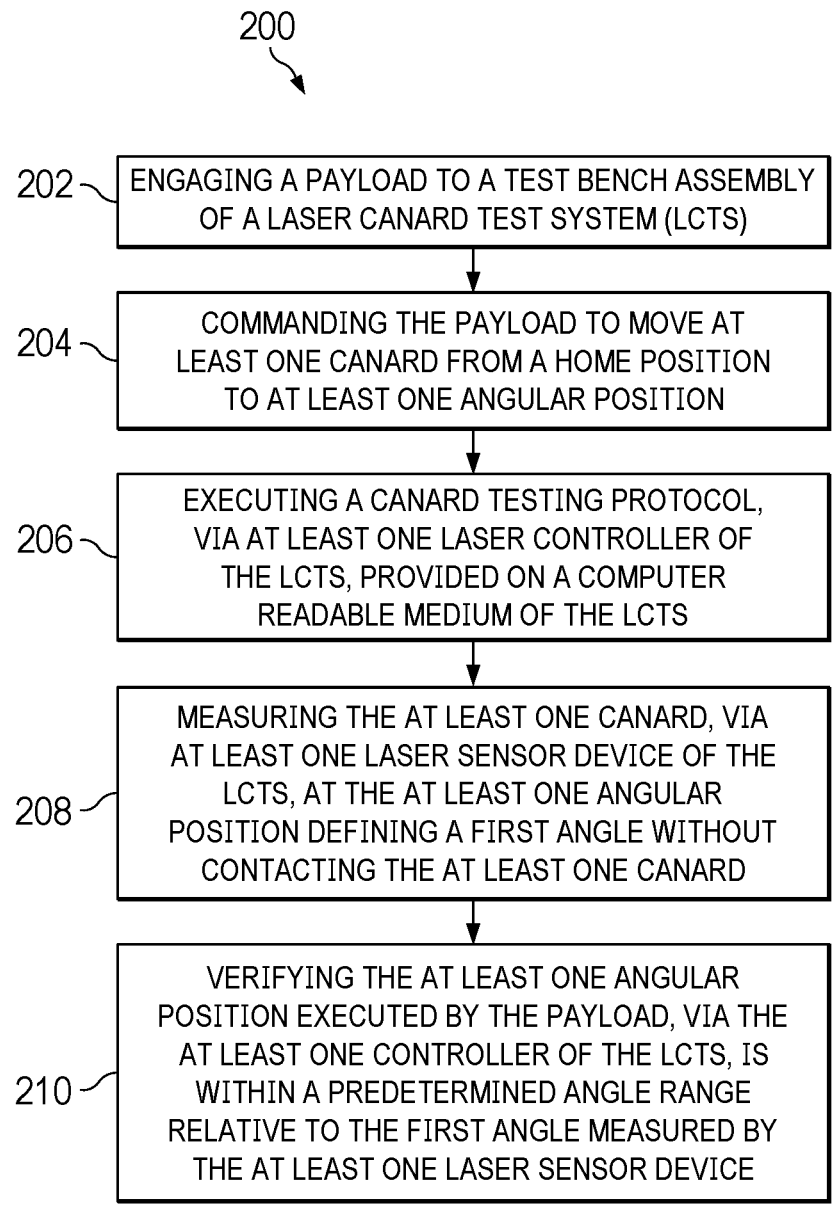
FIG. 10 (FIG. 10) is an exemplary method flowchart.

FIG. 10 illustrates a method 200. An initial step 202 of method 200 may include engaging a payload to a test bench assembly of a laser canard test system (LCTS). Another step 204 of method 200 may include commanding the payload to move at least one canard from a home position to at least one angular position. Another step 206 of method 200 may include executing a canard testing protocol, via at least one laser controller of the LCTS, provided on a computer readable medium of the LCTS. Another step 208 of method 200 may include measuring the at least one canard, via at least one laser sensor device of the LCTS, at the at least one angular position defining a first angle without contacting the at least one canard. Another step 210 of method 200 may include verifying the at least one angular position executed by the payload, via the at least one laser controller of the LCTS, is within a predetermined angle range relative to the first angle measured by the at least one laser sensor device.

In other exemplary embodiment, method 200 may include additional steps and/or optional steps. An optional step may include choosing a set of step testing instructions of the canard testing protocol or a set of sweep testing instructions of the canard testing protocol; wherein when the set of step testing instructions is chosen, the at least one angular position is measured statically when the at least one canard is stationary; and wherein when the set of sweep testing instructions is chosen, the at least one angular position is measured dynamically as the at least one canard is moving. Optional steps may include commanding the payload to move the at least one canard from the at least one angular position to at least another angular position opposite to the at least one angular position; and measuring the at least one canard, via the at least one laser sensor device of the LCTS, at a second angle without contacting the at least one canard when the at least one canard is stationary at the at least another angular position. Optional steps may include commanding the payload to move the at least one canard from the at least another angular position to the home position; and measuring the at least one canard, via the at least one laser sensor device of the LCTS, at a third angle without contacting the at least one canard when the at least one canard is stationary at the home position. An optional step may include verifying the at least another angular position and the home position executed by the payload, via the at least one laser controller of the LCTS, is within the predetermined angle range relative to the second angle and the third angle measured by the at least one laser sensor device. An optional step may include that the step of measuring the at least one canard, via the at least one laser sensor device of the laser canard test system, at the at least one angular position defining the first angle without contacting the at least one canard further includes that the first angle is defined within a first range of angles, via the set of sweep testing instructions, as the at least one canard moves from the home position to the at least one angular position. Optional steps may include commanding the payload to move the at least one canard from the at least one angular position to at least another angular position opposite to the at least one angular position; and measuring a second range of angles, via the at least one laser sensor device of the LCTS, as the at least one canard moves from the at least one angular position to the at least one angular position without contacting the at least one canard. Optional steps may include commanding the payload to move the at least one canard from the at least another angular position to the home position; and measuring the at least one canard, via at least one laser sensor device of the LCTS, at a third set of angles without contacting the at least one canard as the at least one canard moves from the at least another angular position to the home position. An optional step may include verifying the at least another angular position and the home position executed by the payload, via the at least one laser controller of the LCTS, is within the predetermined angle range relative to the second set of angles and the third set of angles measured by the at least one laser sensor device. Optional steps may include engaging a zero-reference payload to the test bench assembly; and calibrating the at least one laser controller and the at least one laser sensor device of the laser canard test system, via the canard testing protocol of the laser canard test system, to at least one zero-reference canard of the zero-reference payload prior to introducing the payload.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A laser canard test system (LCTS), comprising:
a test bench assembly;
at least one laser controller operably engaged with the test bench assembly;
at least one laser sensor device operably engaged with the test bench assembly and in electrical communication with the at least one laser controller; and
a computer readable medium having a canard testing protocol which, when performed by the at least one laser controller, causes the at least one laser device to measure at least one canard on a payload free from contacting the at least one canard of the payload.

2. The laser canard test system of claim 1, wherein the canard testing protocol comprises:
at least one set of testing instructions which, when performed by the at least one laser controller, commands the at least one laser sensor device to one of:
statically measure the at least one canard when the at least one canard is stationary; or
dynamically measure the at least one canard when the at least one canard is moving.

3. The laser canard test system of claim 1, wherein the canard testing protocol comprises:
a set of step testing instructions which, when performed by the at least one laser controller, commands the at least one laser sensor device to statically measure the at least one canard when the at least one canard is stationary.

4. The laser canard test system of claim 3, wherein the set of step testing instructions comprises:
a first set of step commands which, when performed by the at least one laser controller, commands the at least one laser sensor device to statically measure the at least one canard at a first angle when the at least one canard is stationary at a first angular position.

5. The laser canard test system of claim 4, wherein the set of step testing instructions further comprises:
a second set of step commands which, when performed by the at least one laser controller, commands the at least one laser sensor device to statically measure the at least one canard at a second angle when the at least one canard is stationary at a second angular position subsequent to the at least one canard moving from the first angular position to the second angular position.

6. The laser canard test system of claim 5, wherein the step testing framework further comprises:
a third set of step commands which, when performed by the at least one laser controller, commands the at least one laser sensor device to statically measure the at least one canard at a third angle when the at least one canard is stationary at a third angular position subsequent to the at least one canard moving from the second angular position to the third angular position.

7. The laser canard test system of claim 1, wherein the canard testing protocol comprises:
a set of sweep testing instructions which, when performed by the at least one laser controller, commands the at least one laser sensor device to dynamically measure the at least one canard when the at least one canard is moving.

8. The laser canard test system of claim 7, wherein the set of sweep testing instructions comprises:
a first set of sweep commands which, when performed by the at least one laser controller, commands the at least one laser sensor device to dynamically measure the at least one canard at a first set of angles when the at least one canard is moving from a home angular position to a first angular position.

9. The laser canard test system of claim 8, wherein the set of sweep testing instructions further comprises:
a second set of sweep commands which, when performed by the at least one laser controller, commands the at least one laser sensor device to dynamically measure the at least one canard at a second set of angles when the at least one canard is moving from the first angular position to a second angular position.

10. The laser canard test system of claim 9, wherein the set of sweep testing instructions further comprises:
a third set of sweep commands which, when performed by the at least one laser controller, commands the at least one laser sensor device to dynamically measure the at least one canard at a third set of angles when the at least one canard is moving from the second angular position to the home angular position.

11. A method, comprising:
engaging a payload to a test bench assembly of a laser canard test system (LCTS);
commanding the payload to move at least one canard from a home position to at least one angular position;
executing a canard testing protocol, via at least one laser controller of the LCTS, provided on a computer readable medium of the LCTS;
measuring the at least one canard, via at least one laser sensor device of the LCTS, at the at least one angular position defining a first angle without contacting the at least one canard; and
verifying the at least one angular position executed by the payload, via the at least one laser controller of the LCTS, is within a predetermined angle range relative to the first angle measured by the at least one laser sensor device.

12. The method of claim 11, further comprising:
engaging a zero-reference payload to the test bench assembly; and
calibrating the at least one laser controller and the at least one laser sensor device of the laser canard test system, via the canard testing protocol of the laser canard test system, to at least one zero-reference canard of the zero-reference payload prior to introducing the payload.

13. The method of claim 11, further comprising:
choosing a set of step testing instructions of the canard testing protocol or a set of sweep testing instructions of the canard testing protocol;
wherein when the set of step testing instructions is chosen, the at least one angular position is measured statically when the at least one canard is stationary; and
wherein when the set of sweep testing instructions is chosen, the at least one angular position is measured dynamically as the at least one canard is moving.

14. The method of claim 13, further comprising:
commanding the payload to move the at least one canard from the at least one angular position to at least another angular position opposite to the at least one angular position; and
measuring the at least one canard, via the at least one laser sensor device of the LCTS, at a second angle without contacting the at least one canard when the at least one canard is stationary at the at least another angular position.

15. The method of claim 14, further comprising:
commanding the payload to move the at least one canard from the at least another angular position to the home position; and
measuring the at least one canard, via the at least one laser sensor device of the LCTS, at a third angle without contacting the at least one canard when the at least one canard is stationary at the home position.

16. The method of claim 15, further comprising:
verifying the at least another angular position and the home position executed by the payload, via the at least one laser controller of the LCTS, is within the predetermined angle range relative to the second angle and the third angle measured by the at least one laser sensor device.

17. The method of claim 13, wherein the step of measuring the at least one canard, via the at least one laser sensor device of the laser canard test system, at the at least one angular position defining the first angle without contacting the at least one canard further includes that the first angle is defined within a first range of angles, via the set of sweep testing instructions, as the at least one canard moves from the home position to the at least one angular position.

18. The method of claim 17, further comprising:
commanding the payload to move the at least one canard from the at least one angular position to at least another angular position opposite to the at least one angular position; and
measuring a second range of angles, via the at least one laser sensor device of the LCTS, as the at least one canard moves from the at least one angular position to the at least one angular position without contacting the at least one canard.

19. The method of claim 18, further comprising:
commanding the payload to move the at least one canard from the at least another angular position to the home position; and
measuring the at least one canard, via at least one laser sensor device of the LCTS, at a third set of angles without contacting the at least one canard as the at least one canard moves from the at least another angular position to the home position.

20. The method of claim 19, further comprising:
  verifying the at least another angular position and the home position executed by the payload, via the at least one laser controller of the LCTS, is within the predetermined angle range relative to the second set of angles and the third set of angles measured by the at least one laser sensor device.

\* \* \* \* \*